United States Patent
Myhre et al.

(10) Patent No.: US 10,528,244 B2
(45) Date of Patent: Jan. 7, 2020

(54) DETAILS PANE OF A USER INTERFACE

(71) Applicant: Microsoft Technology Licensing, LLC, Redmond, WA (US)

(72) Inventors: Kirk R. Myhre, Redmond, WA (US); John H. Miller, Seattle, WA (US); Thomas B. Michon, Redmond, WA (US); Kristen Kamath, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/342,029

(22) Filed: Nov. 2, 2016

(65) Prior Publication Data

US 2017/0315689 A1  Nov. 2, 2017

Related U.S. Application Data

(60) Provisional application No. 62/329,915, filed on Apr. 29, 2016.

(51) Int. Cl.
*G06F 3/048* (2013.01)
*G06F 3/0485* (2013.01)
*G06F 3/0482* (2013.01)

(52) U.S. Cl.
CPC .......... *G06F 3/0485* (2013.01); *G06F 3/0482* (2013.01)

(58) Field of Classification Search
CPC .............................. G06F 3/0485; G06F 3/0482
See application file for complete search history.

(56) References Cited

U.S. PATENT DOCUMENTS

| | | | |
|---|---|---|---|
| 7,360,168 B2 | 4/2008 | Bertram et al. |
| 7,620,902 B2 | 11/2009 | Manion et al. |
| 8,209,629 B2 | 6/2012 | Laurie et al. |
| 8,351,995 B2 | 1/2013 | Dobroth et al. |
| 8,666,909 B2 | 3/2014 | Pinckney et al. |
| 8,743,151 B1 | 6/2014 | Bodis et al. |

(Continued)

OTHER PUBLICATIONS

Web site https://css-tricks.com/almanac/selectors/c/class , last updated on Sep. 6, 2011, snapshot of Apr. 28, 2016, downloaded from www.archive.org using the Wayback machine on Aug. 2, 2018.*

(Continued)

*Primary Examiner* — Claudia Dragoescu
(74) *Attorney, Agent, or Firm* — NovoTechIP International PLLC

(57) ABSTRACT

Techniques and technologies for a details pane of a user interface are described. In at least some embodiments, a system includes a user interface component operable to render a content section at least partially viewable within a details pane, the content section including a section header; when the location of the section header is above an uppermost available position within the details pane, causing an upper sticky header that is a duplicate of the section header to be visible at the uppermost available position; when the location of the section header is below a lowermost available position within the details pane, causing a lower sticky header that is another duplicate of the section header to be visible at the lowermost available position; and when the location of the section header is at or between the uppermost and the lowermost available positions, causing the section header to be visible.

20 Claims, 19 Drawing Sheets

(56) References Cited

U.S. PATENT DOCUMENTS

| | | | |
|---|---|---|---|
| 2007/0124695 A1* | 5/2007 | Brodie | G06F 3/0481 |
| | | | 715/781 |
| 2009/0063972 A1* | 3/2009 | Ma | G06F 3/048 |
| | | | 715/716 |
| 2011/0199318 A1* | 8/2011 | Fong | G06F 3/0488 |
| | | | 345/173 |
| 2014/0136993 A1 | 5/2014 | Luu et al. | |
| 2014/0189578 A1 | 7/2014 | Shuttleworth et al. | |
| 2014/0215388 A1 | 7/2014 | Park-Ekecs et al. | |
| 2014/0325353 A1 | 10/2014 | Chudge et al. | |
| 2015/0113443 A1* | 4/2015 | Breger | G06F 3/04817 |
| | | | 715/753 |
| 2015/0277725 A1 | 10/2015 | Masterson et al. | |
| 2016/0170576 A1* | 6/2016 | Brown | G06F 3/0482 |
| | | | 715/784 |

OTHER PUBLICATIONS

"International Search Report and Written Opinion Issued in PCT Application No. PCT/US2017/029038", dated Jul. 11, 2017, 13 Pages.

"Content Views", Published on: Oct. 20, 2014 Available at: https://developer.apple.com/library/ios/documentation/UserExperience/Conceptual/MobileHIG/ContentViews.html.

Lentz, James L., "User interface design for the mobile web", Published on: Jul. 26, 2011 Available at: http://www.ibm.com/developerworks/library/wa-interface/.

\* cited by examiner

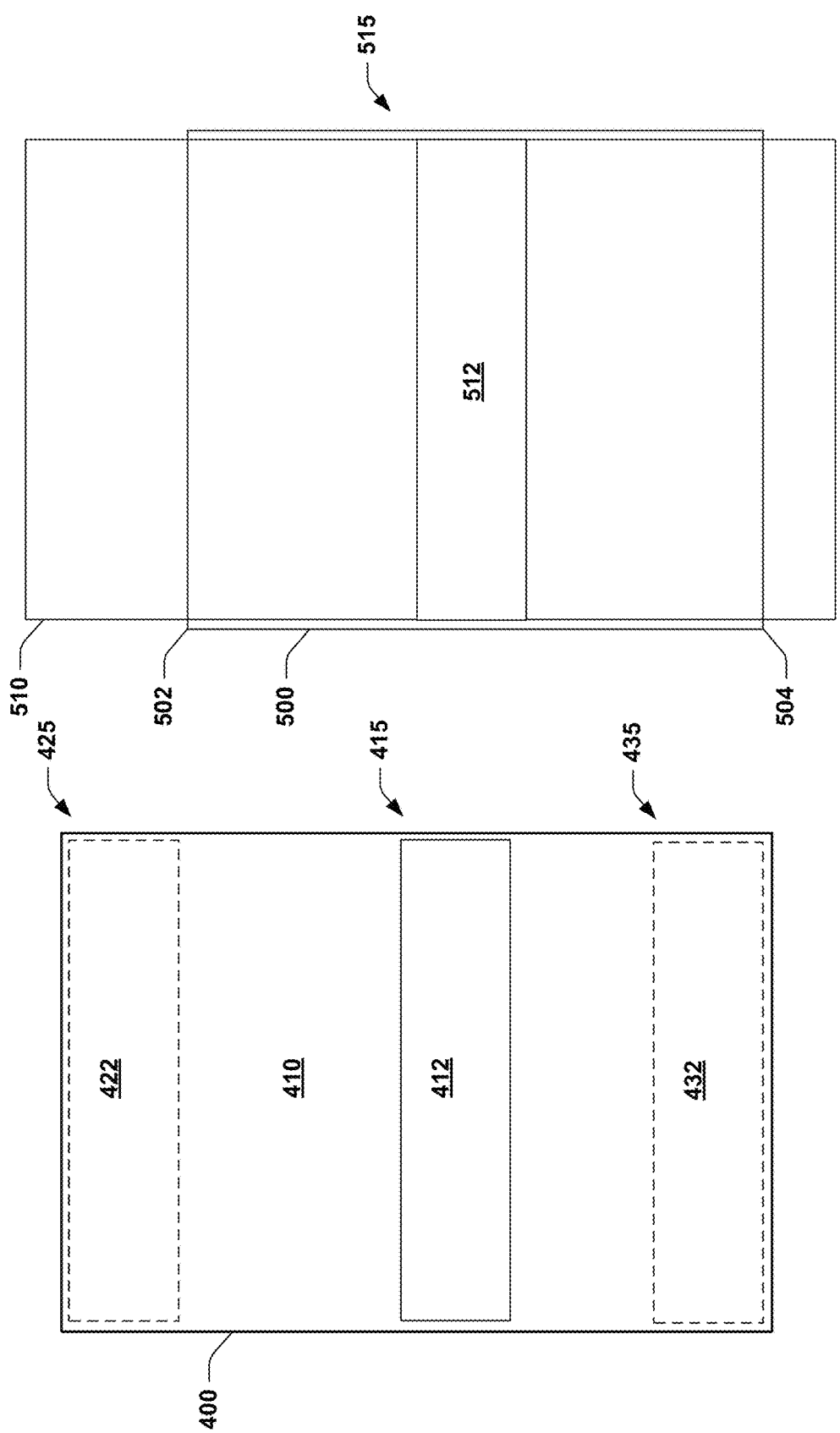

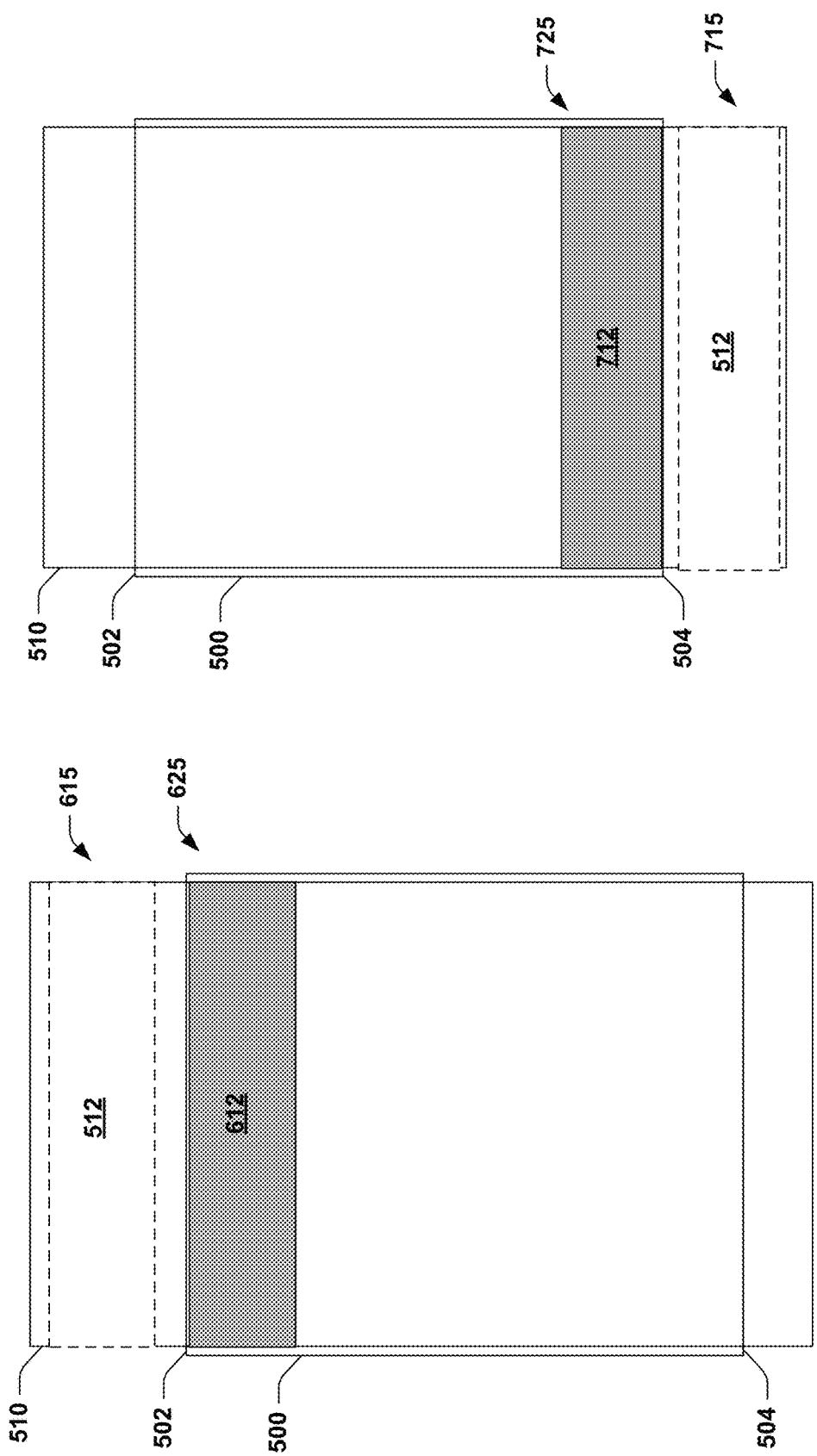

```html
<div class="Invention">
    <div id="invention-clientSurface">
        <div id="invention-scrollSurface">
            <div id="invention-contentSection-1" class="Invention-contentSection">
                <div class="Invention-contentSection-content">
                    <!-- item preview -->
                </div>
            </div>
            <div id="invention-contentSection-2" class="Invention-contentSection">
                <div id="Invention-sectionHeader-2" class="Invention-sectionHeader">
                    <div class="Invention-header">
                        <!-- section content 2 title -->
                    </div>
                </div>
                <div class="Invention-contentSection-content">
                    <!-- item social activities -->
                </div>
            </div>
            <div id="invention-contentSection-3" class="Invention-contentSection">
                <div id="Invention-sectionHeader-3" class="Invention-sectionHeader">
                    <div class="Invention-header">
                        <!-- section content 3 title -->
                    </div>
                </div>
                <div class="Invention-contentSection-content">
                    <!-- item information and metadata -->
                </div>
            </div>
        </div>
    </div>

<div id="invention-stickySurface">
        <div class="Invention-stickySurface-top">
            <div class="Invention-stickyHeader-2">
                <div class="Invention-header">
                    <!-- section content 2 title -->
                </div>
            </div>
        </div>
        <div class="Invention-stickySurface-bottom">
            <div class="Invention-stickyHeader-3">
                <div class="Invention-header">
                    <!-- section content 3 title -->
                </div>
            </div>
        </div>
    </div>
</div>
```

DETAILS PANE OF A USER INTERFACE

BACKGROUND

Some software applications employ a user interface that includes a portion referred to as a "details pane". Conventionally, a details pane is a surface used as a reference location to display general and overall status type content. A user typically opens the details pane, gets what information they need, and closes the details pane to continue whatever they were working on.

SUMMARY

Techniques and technologies for a details pane of a user interface are described that may provide considerable advantages over convention systems. For example, in at least some implementations, because the details pane provides a scroll surface with a variety of information types and functionalities, techniques and technologies in accordance with the present disclosure may reduce or alleviate problems associated with conventional systems wherein users cannot quickly access information they care about without having to scroll repeatedly and numerous times through other content. Thus, techniques and technologies in accordance with the present disclosure may advantageously eliminate the need for repeated scroll operations by providing access to such desired information and functionality which may be a single tap or click away, thereby improving the efficiency and operability of a computing system in terms of fewer processing cycles and reduced power consumption in comparison with conventional systems.

In at least some implementations, a system comprises: a processing component operatively coupled to a memory; a user interface component at least partially stored on the memory, the user interface component including one or more instructions executable by the processing component configured to perform one or more operations including at least: rendering a user interface including a details pane for display on a display device; rendering a a content section at least partially viewable within the details pane, the content section being scrollably moveable with respect to the details pane, the content section including a section header; monitoring a location of the section header as the content section is scrollably moved with respect to the details pane; when the location of the section header is above an uppermost available position that is visible within the details pane, causing an upper sticky header that is a duplicate of the section header to be visible at the uppermost available position and causing the section header to not be visible; when the location of the section header is below a lowermost available position that is visible within the details pane, causing a lower sticky header that is another duplicate of the section header to be visible at the lowermost available position and causing the section header to not be visible; and when the location of the section header is at or below the uppermost available position and at or above the lowermost available position, causing the section header to be visible and causing the upper sticky header and the lower sticky header to not be visible.

Furthermore, in at least some implementations, a system comprises: a processing component operatively coupled to a memory; a user interface component at least partially stored on the memory, the user interface component including one or more instructions executable by the processing component configured to perform one or more operations including at least: rendering a user interface including a details pane for display on a display device; rendering a scroll surface at least partially visible within the details pane, the scroll surface including a first content section having a first section header and a second content section below the first content section and having a section section header, the first and second content sections being moveable with respect to the details pane; receiving an input indicative of a user selecting the first section header; resizing the second content section to be coincident with the second section header; causing the second section header to be visible at a lowermost available position within the details pane; causing the first section header to be visible at an uppermost available position within the details pane; and causing at least a portion of the first content section to be visible within a remaining visible area of the details pane above the second section header.

In addition, in at least some implementations, a method of operating a user interface comprises: rendering a user interface including a details pane for display on a display device; rendering a content section within a scroll surface at least partially viewable within the details pane, the content section being scrollably moveable with respect to the details pane, the content section including a section header; receiving an input indicative of a user performing a scrolling operation; moving the content section relative to the details pane responsive to the input indicative of the user performing the scrolling operation; while moving the content section, monitoring a location of the section header; when the location of the section header is above an uppermost available position, causing an upper sticky header to be visible at the uppermost available position and causing the section header to not be visible; when the location of the section header is below a lowermost available position, causing a lower sticky header that is another duplicate of the section header to be visible at the lowermost available position and causing the section header to not be visible; and when the location of the section header is at or below the uppermost available position and at or above the lowermost available position, causing the section header to be visible at the location and causing the upper sticky header and the lower sticky header to not be visible.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

FIG. 4 shows an embodiment of an interoperability of a details pane with a scroll surface.

FIGS. 5-7 show another embodiment of an interoperability of a details pane with a scroll surface.

FIG. 8 shows an embodiment of an HTML, control code for a details pane of a user interface.

DETAILED DESCRIPTION

Figure 1:
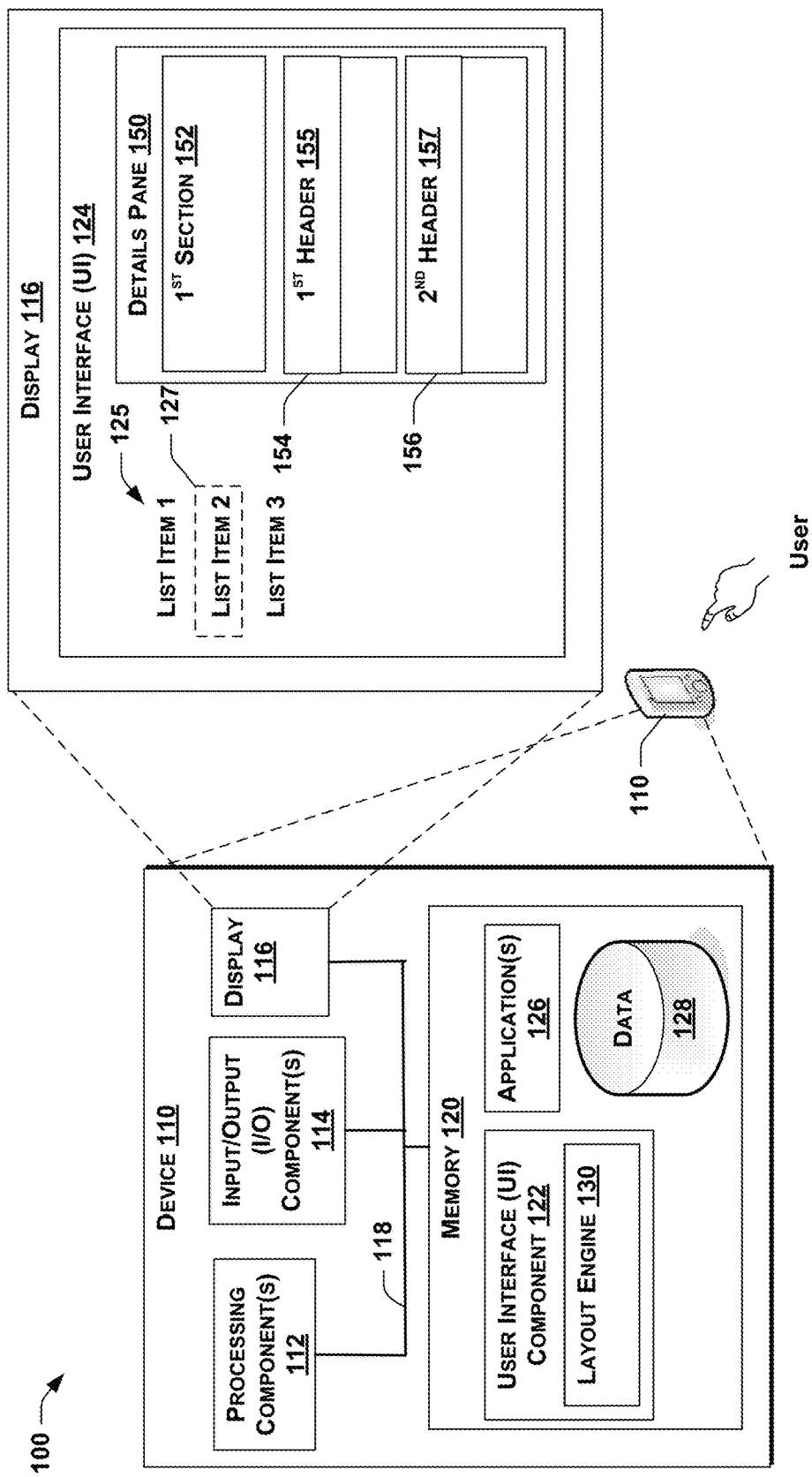
FIG. 1 shows an embodiment of an environment for a user interface having a details pane.

The present disclosure describes techniques and technologies for a details pane of a user interface. As described more fully below, a details pane of a user interface in accordance with the present disclosure may advantageously provide a multi-surface pane that supports tiers of information (primary/secondary), such that secondary information and functionality is not more than one tap or click away. In this way, the overall functionality of a computing device may be improved in terms of fewer processing cycles (and correspondingly less power consumption) needed to determine desired information or to perform one or more desired functionalities.

More specifically, in at least some implementations, a details pane of a user interface in accordance with the present disclosure may present primary content and functionality that's contextual to the endpoint, to the selection (implicit or explicit), or both. And in at least some implementations, a user may leave the details pane open in all states of the application and the content/functionality presented supports their understanding of and ability to interact seamlessly with that content. These additional aspects may also contribute to and improve the overall functionality of a computing device in terms of fewer processing cycles (and correspondingly less power consumption) needed to determine desired information or to perform desired functionalities. Such implementations are described more fully below.

At least some implementations of a details pane of a user interface in accordance with the present disclosure provide a mechanism to arrange controls on a graphical user interface to display information to a user in a progressive fashion. In addition, at least some implementations of a details pane of a user interface in accordance with the present disclosure allow a user to switch between a continuous presentation of information or a subject-focused modal presentation. And at least some implementations of a details pane of a user interface in accordance with the present disclosure dynamically transition between the two modes in a way meant to preserve continuity of the user's experience. Such implementations are described more fully below.

In addition, at least some implementations of a details pane of a user interface in accordance with the present disclosure may include a synthesis of the existing accordion panel model and sticky header model to make an interactive surface used for displaying customizable data for display and interactivity. Further, at least some implementations of a details pane of a user interface in accordance with the present disclosure use sticky headers to provide modality and scrollable interaction. Typically, accordion containers do not have scrollable functionality whereas at least some implementations of a details pane of a user interface in accordance with the present disclosure implement scrolling as a way of navigation through "accordion" like content sections. Such implementations are described more fully below.

FIG. 1 shows an embodiment of an environment 100 for a details pane 150 of a user interface 124 in accordance with the present disclosure. In this embodiment, the environment 100 includes a device 110 that includes one or more processing components 112, one or more input/output (I/O) components 114, and a display 116 operatively coupled to a memory 120 by a bus 118.

In the embodiment shown in FIG. 1, a user interface (UI) component 122 is stored on the memory 120. In at least some implementations, the user interface component 122 includes executable instructions that, when executed by the one or more processing components 112, cause the user interface 124 to be displayed on the display 116 of the device 110. In this embodiment, one or more applications 126 and data 128 are stored on the memory 120. The one or more applications 126 may be invoked by a user of the device 110 to perform a variety of operations, such as displaying at least part of the data 128 on the display 116 via the user interface 124. For example, in at least some implementations, at least part of the data 128 may be displayed as a list 125 of items (e.g. List Item 1, List Item 2, List Item 3, etc.).

In at least some implementations, the user interface (UI) component 122 includes a layout engine 130. The layout engine 130 may include executable instructions that are configured to perform operations that display the details pane 150 of the user interface 124 on the display 116 having one or more of the functionalities and aspects as described herein. For example, in at least some implementations, the layout engine 130 may convert executable instructions (e.g. markup language, etc.) into a composition of nested controls (e.g. rectangular controls), and may provide sizing and location information for the appearance of such nested controls on the screen. An example suitable implementation of the layout engine 130 may include a HyperText Markup Language (HTML) based web browser with support for Ecma International scripting language (ECMAScript).

As shown in FIG. 1, in at least some implementations, when a user make a selection of a selected item 127 from the list of displayed items 125, the layout engine 130 is configured to generate one or more corresponding controls (e.g. content sections, section headers, etc.) within the details pane 150 of the user interface 124, and populates such controls with information or functionalities that are associated with the selected item 127. More specifically, in at least some implementations, the layout engine 130 may generate a first content section 152, a second content section 154 having a first section header 155, and a second content section 156 having a second section header 157 within the details pane 150. Generally, in at least some implementations, a control (e.g. first header 155, second header 157, etc.) may include an independent layout component rendered by the layout engine 130, and may have a parent control and zero or more child controls, and may also have a current screen position, width, and height. In at least some implementations, based on one or more parameters provided via the layout engine 130, a control (e.g. first header 155, second header 157, etc.) may have different behaviors (e.g. "box model" behaviors), including, for example, height, width, margins, padding, or other suitable aspects. In at least some implementations, these properties may support animation natively via the layout engine 130. In at least some implementations, a control may be a single HTML, element, such as, for example, in a web browser application.

It will be appreciated that the device 110 shown in FIG. 1 may represent a variety of possible device types, including but not limited to a handheld device, such as a cellular telephone, a Personal Data Assistant (PDA), a notebook computer, a tablet computer, a slate computer, a laptop computer, a smart watch, or any other handheld device. It should be understood, however, that the device 110 is not limited to a handheld device, and may represent a server, a mainframe, a workstation, a distributed computing device (e.g. a control component of a distributed computing device), a portion of a larger device or system, or any other suitable type of device. In still other embodiments, the device 110 may be a television, a wearable device, a vehicle (or portion of a vehicle), an appliance (or portion of an appliance), a consumer product, or virtually any other suitable device.

In addition, in at least some implementations, the display 116 may be a touch-sensitive display that detects and accepts one or more inputs via one or more gestures. The one or more gestures may include contact with a surface of the display (e.g. using a finger, a stylus, or other suitable object to contact, touch, tap, press, slide, swipe, etc.), or may include a movement near the surface of the display (e.g. near-surface movement, hovering, etc.), or any suitable combination thereof. Of course, in alternate implementations, the display 116 may be a conventional display that is not touch sensitive.

Figure 2:
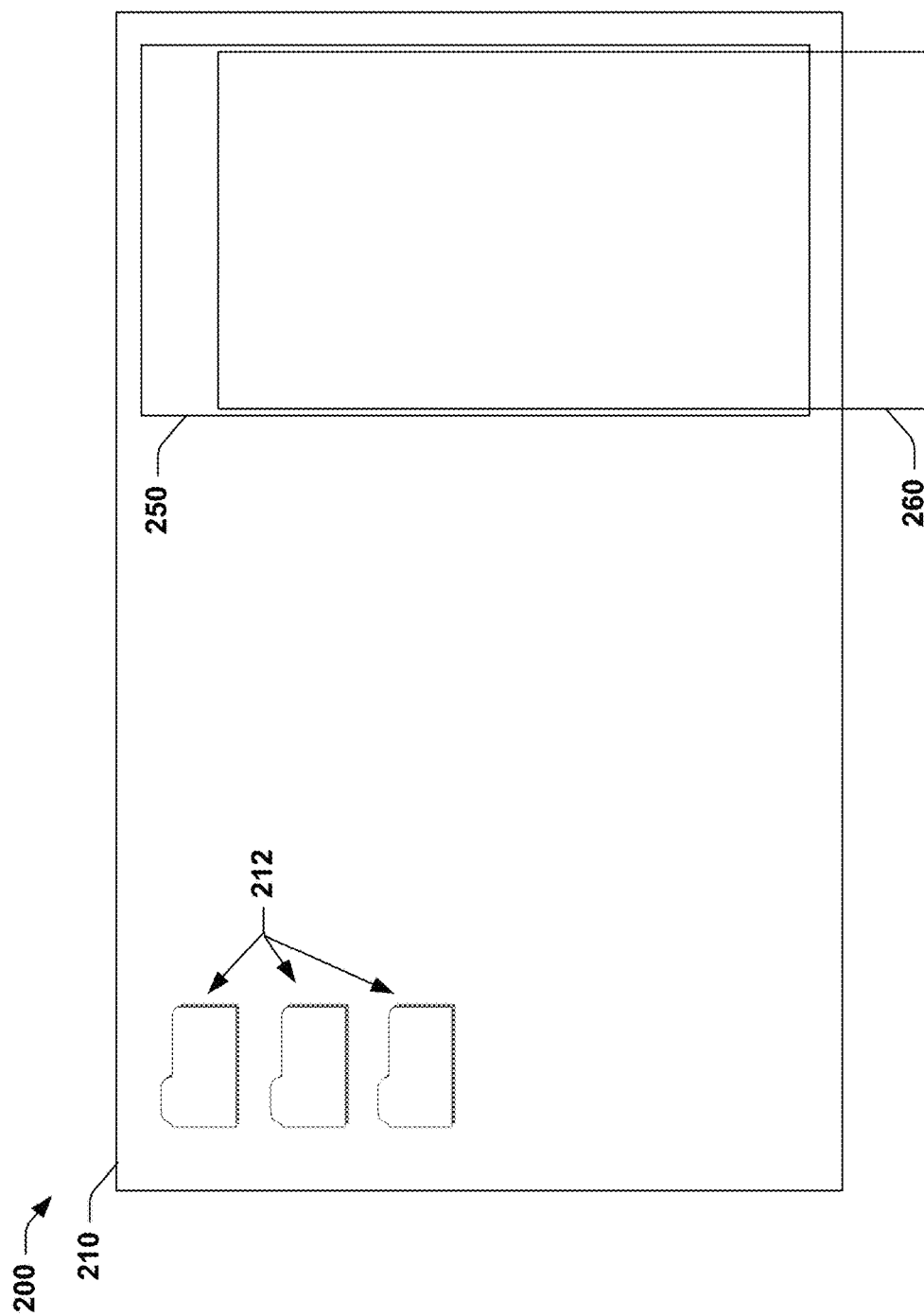
FIG. 2 shows an embodiment of an environment having a user interface that includes a details pane and a scroll surface.

FIG. 2 shows additional aspects of an environment 200 including a user interface 210 having a details pane 250 (or client area). In at least some implementations, the details pane 250 is an area provided by the host user experience (e.g. one or more of the applications 126 operating on the user's device 110, one or more of the applications 126 operating in conjunction with the layout engine 130 of the UI component 120 operating on the device 110, etc.) into which the behaviors in this invention will be rendered when a user selects at least one of the selectable items 212 (e.g. files, folders, etc.) displayed by the user interface 210. For example, in at least some implementations, the host user experience may control the size and location of the details pane 250, and may provide notifications to the details pane 250 when new data is available, or when signals are received indicating that a control (e.g. first header 155, second header 157, etc.) is moved or resized on the user interface 210.

As further shown in FIG. 2, a scroll surface 260 may also be rendered by the host user experience, and the scroll surface 260 may not coincide with the details pane 250, and may typically extend beyond the boundaries of the details pane 250. For example, in at least some implementations, the width of the scroll surface 260 may match (or approximately match) that of the details pane 250, however, the height of the scroll surface 260 may not match that of the details pane 250, but rather, may be dependent on the required sizes of content rendered within by the host user experience. As shown in FIG. 2, in at least some implementations, the rendered region of the scroll surface 260 may be clipped to the bounds of the details pane 250. In operation, as the user initiates a scroll action, the scroll surface 260 may move within the details pane 250 in an amount appropriate to the distance and direction of the user scroll.

Figure 3:
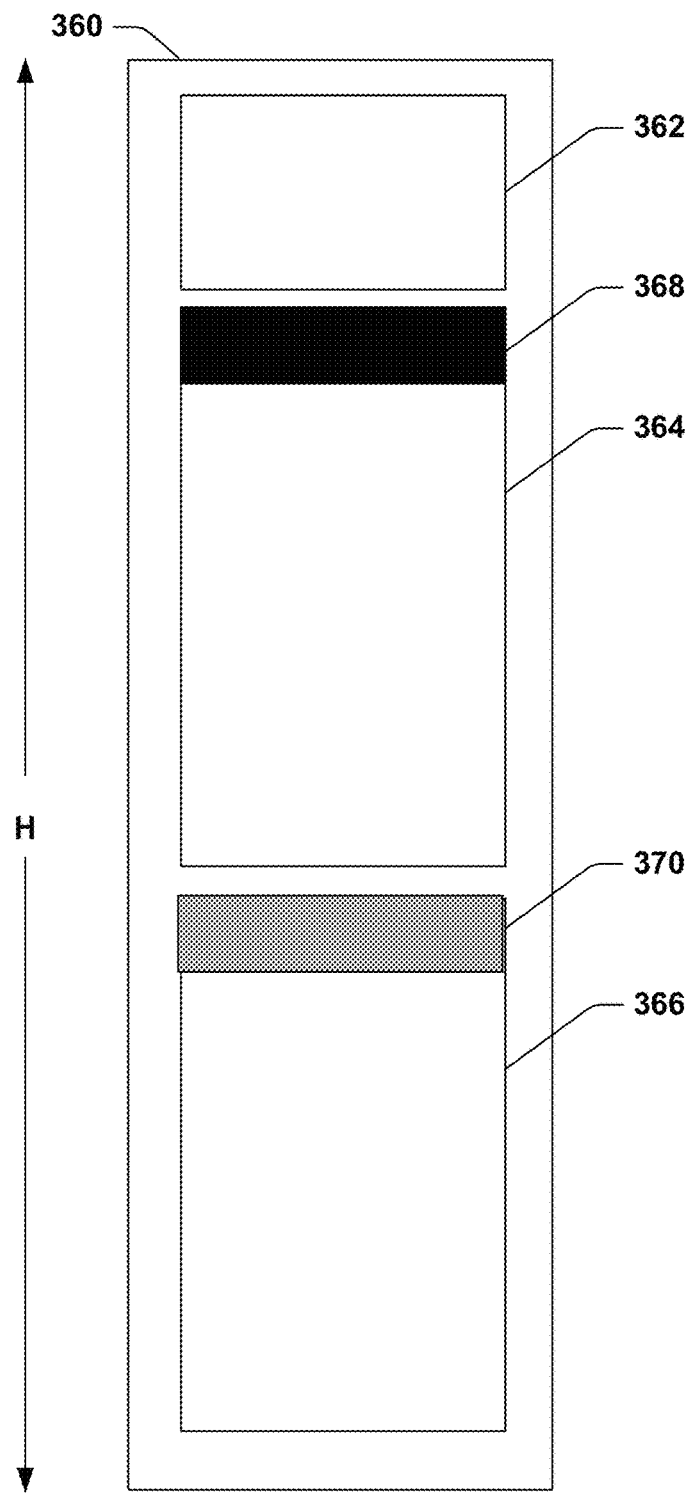
FIG. 3 shows an embodiment of a scroll surface.

FIG. 3 shows additional aspects of an embodiment of a scroll surface 360 in accordance with the present disclosure. In this implementation, the scroll surface 360 includes a first content section 362 (or child element), a second content section 364, and a third content section 366. When a user selects one of the selectable items 212 (see FIG. 2), the content sections 362, 364, 366 may become populated with various information or functionalities associated with the particular selectable item 212, as described more fully below. In at least some implementations, one or more of the content sections (e.g. the third content section 366) may indicate that it supports a modal operational state, as described more fully below (e.g. with reference to FIGS. 12-13).

In at least some implementations, one or more content section controls (e.g. headers) may be rendered into the content sections 362, 364, 366 of the scroll surface 360. For example, in the embodiment shown in FIG. 3, the first content section 362 (or child element) has no header, while a first header 368 is rendered into the second content section 364, and a second header 370 is rendered into the third content section 366. A total rendered height H of the scroll surface 360 may be equal to the sum of the heights of all child content sections (e.g. content sections 362, 364, 366), and as noted above, may be different from a corresponding height of the details pane 250, as shown in FIG. 2. In at least some implementations, the layout engine 130 (FIG. 1) maintains this sizing relationship during one or more operations of the user interface 210 (FIG. 2).

In at least some implementations, one or more of the content sections 362, 364, 366 may have its own markup template which determines which subset of the provided input data it will render. Thus, when one or more of the content sections 362, 364, 366 receives new data, the layout engine 130 may re-render the one or more of the content sections 362, 364, 366, and may compute new position and dimension information to accommodate the data that is to be rendered within the one or more of the content sections 362, 364, 366.

With continued reference to FIG. 3, it should be appreciated that the first header 368 is a control rendered at the top of the second content section 364 and the second header 370 is a control rendered at the top of the third content section 366. In at least some implementations, a template markup is provided by the content section (e.g. sections 364, 370) for its associated header (e.g. headers 368, 370), such that the content section may indicate to the details pane 250 of the user interface 210 which header it is associated with for tracking purposes.

In addition, it will be appreciated that, in at least some implementations, a wide variety of items or assets may be used as the selectable items 212 (or selected list item 127). For example, the selectable items 212 may include one or more of a folder, a photo, a video, a productivity-tool document (e.g. Microsoft Office® documents, etc.), miscellaneous file types (e.g. .pdf files, .txt files, "quicklookable" file types, etc.), or multi-selection items (e.g. mixed types, mixed shared status, mixed offline/online status, etc.). Similarly, a wide variety of information types or categories may be presented within the content sections of the scroll surface. For example, in at least some implementations, the content sections may provide one or more of preview information, comments, activity information, history information, permission information, status information (e.g. online, offline, etc.), tag information, version information, general file information (e.g. size, type, date modified, etc.), location information (e.g. storage location), likes, preference information, or affinity information (e.g. future direction, etc.). In at least some implementations, the set of information and functionality enabled enables through a details pane may differ due to one or more native functionality differences across one or more platforms.

Techniques and technologies for a details pane of a user interface in accordance with the present disclosure may, in at least some implementations, provide a wide variety of command functionalities. In at least some implementations, a command bar (or applications bar) may still serve as a primary commanding surface relative to content of a selectable item, a details pane may also include numerous commands relative to the content presented in the details pane (e.g. content sections). For example, in at least some implementations, a details pane may provide one or more of a sharing command, a movement command, a deletion command, a download command, a rename command, a comment command, an approval indication command (e.g. "like," etc.), a caption command, a modify permissions command, a status control command (e.g. offline only, online only, etc.), a retrieve command, a restore command, a communication command, an association command, or any other suitable command. In addition, a details pane may further provide one or more commands that may determine behavior considerations, such as an open command (e.g. native applications, etc.), a "quicklook" command, or a preview pane command. Again, in at least some implementations, the set of commands provided through a details pane may differ due to one or more native functionality differences across one or more platforms.

It will be appreciated that the scroll surface 360, in at least some implementations, provides a multi-surface (or multi-sectioned) pane that supports tiers of information (e.g. primary information, secondary information, etc.) that is contextual to the endpoint and to the selection (e.g. list item 127, selectable items 212, etc.). Accordingly, such a details pane and scroll surface of a user interface may advantageously ensure that all secondary information is readily available to a user. More specifically, in at least some implementations, the secondary information provided by such a multi-sectional scroll surface may be not more than one tap or click away. In this way, techniques and technologies for a details pane of a user interface in accordance with the present disclosure may advantageously provide considerable improvements to operations of a computer, including reducing processing cycles, and reducing energy consumption, in comparison with prior art methods of accessing of such information.

FIG. 4 shows an embodiment of an interoperability of a details pane 400 with a scroll surface 410. In this implementation, the scroll surface 410 includes an inline section header 412 that is visible at a first position 415 within the details pane 400. In addition, in the embodiment shown in FIG. 4, a top sticky header 422 is depicted at a top position 425 of the details pane 400, and a bottom sticky header 432 is depicted at a bottom position 435 of the details pane 400. It will be appreciated that, in the embodiment shown in FIG. 4, the top position 425 is an uppermost available position that is visible within the details pane 400, while the bottom position 435 is a lowermost available position that is visible within the details pane 400.

Generally, in at least some implementations a sticky header (e.g. top sticky header 422, bottom sticky header 432) may be a copy of a section header (e.g. section header 412), and may be directly rendered into the details pane 400 visibly in front of the scroll surface 410. In at least some implementations, the sticky headers 422, 432 do not move when the user initiates scroll actions, but rather, they may change visibility based on the position of their associated section header 412. Thus, when the section header 412 is at an intermediate (or fully visible) position within the details pane 400, the top and bottom sticky headers 422, 432 are not visible (as indicated by the dashed lines). If the scrolling action of the user moves the section header 412 at least partially above the top position 425 (where it would be at least partially out of view of the boundaries of the details pane 400), the top sticky header 422 becomes visible at the top position 425 and remains visible while its associated section header 412 is at least partially above the top position 425. Similarly, if the scrolling action of the user moves the section header 412 at least partially below the bottom position 435 (where it would be at least partially out of view of the boundaries of the details pane 400), the bottom sticky header 432 becomes visible at the bottom position 435 and remains visible while its associated section header 412 is at least partially below the bottom position 435. In at least some implementations, if the upward (or downward) scrolling action of by the user brings a new section header (not shown) into view within the details pane 400, then the top sticky header 422 (or bottom sticky header 432) may disappear from view, and two new sticky headers that are copies of the new section header may come into use, and may be selectively rendered as described above as the new section header moves into and out of view within the details pane 400.

FIG. 5 shows another embodiment of an interoperability of a details pane 500 with a scroll surface 510. In this embodiment, the scroll surface 510 is depicted as extending beyond an upper end 502 and a lower end 504 of the details pane 500. In a first position 515, a section header 512 is positioned at (and is visually displayed at) an intermediate location within the details pane 500.

FIG. 6 shows the details pane 500 of FIG. 5 after a user has performed a scrolling operation that has moved the section header 512 to a second position 615 on the scroll surface 510. It will be appreciated, however, that although the second position 615 of the section header 512 is beyond the upper end 502 of the details pane 500, and would therefore normally not be displayed within the details pane 500, an upper sticky header 612 that duplicates the section header 512 has been rendered at a top position 625 of the details pane 500 and remains within view in the details pane 500. In at least some implementations, the upper sticky header 612 is rendered and remains visible at the top 625 of the details pane 500 for any second position 615 of the section header 512 on the scroll surface 510 that is at least partially above the upper end 502 of the details pane 500.

Similarly, FIG. 7 shows the details pane 500 of FIG. 5 after a user has performed a scrolling operation that has moved the section header 512 to a third position 715 on the scroll surface 510. Again, although the third position 715 is beyond the lower end 504 of the details pane 500, a lower sticky header 712 has been rendered and has "stuck" at a bottom 725 of the details pane 500 and remains within view in the details pane 500. In at least some implementations, the lower sticky header 712 remains visible at the bottom 725 of the details pane 500 for any third position 715 on the scroll surface 510 that is at least partially below the lower end 504 of the details pane 500.

Figure 18:
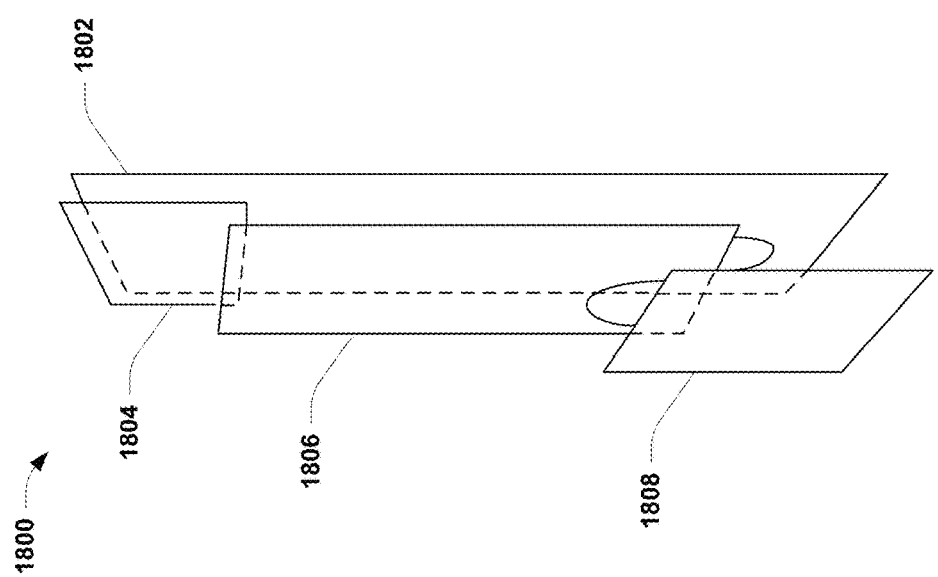
FIG. 18 shows a multi-layer display environment in a primary state.

In at least some implementations, the above-described operability of a details pane of a user interface may be enabled by a multi-layer display environment wherein different content may be displayed on different layers. For example, FIG. 18 shows a multi-layer display environment in a primary state 1800. In this embodiment, the multi-layer display environment in the primary state 1800 includes an application canvas (or scroll surface) 1802. A supplementary items (or "preview") layer 1804 is proximate to, and overlaps a portion of, the application canvas 1802. A primary content layer 1806 is proximate to, and overlaps a portion of, the supplementary items layer 1804, and a secondary content layer 1808 is proximate to, and overlaps a portion of, the primary content layer 1806. In at least some implementations, the multi-layer display environment 1800 supports tiers of information (e.g. primary, secondary, etc.) on different layers, and may present such content that is contextual to an endpoint and to the user's selection (implicit or explicit), and may ensure that all secondary information is not more than a tap (or click) away.

Figure 19:
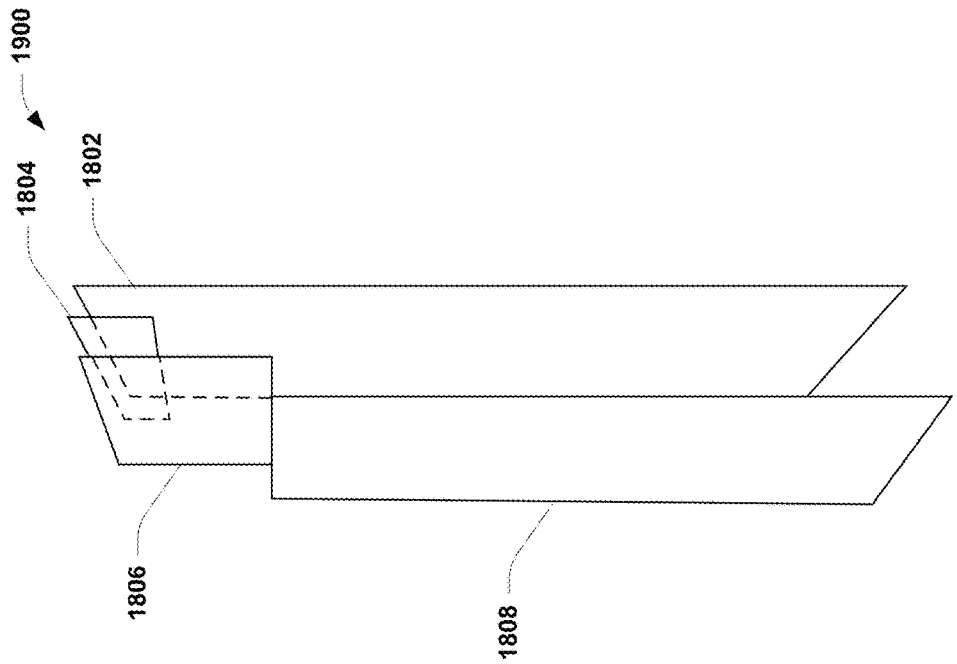
FIG. 19 shows a multi-layer display environment in a panned state.

FIG. 19 shows the multi-layer display environment in a panned state 1900. In this embodiment, the secondary content layer 1808 has increased substantially in size, and the primary content layer 1806 has moved upwardly so as to fully overlap the supplementary items layer 1804. Thus, the panned state 1900 of the multi-layer display environment may represent, for example, a state in which the user has scrolled (or panned) downwardly to view additional secondary information displayed by the secondary content layer 1808.

In at least some implementations, the operability of the content headers and sticky headers described above with reference to FIGS. 3-7 may be implemented using two user-experience (UX) layers of the multi-layer display environment shown in FIGS. 18-19. For example, in at least some implementations, the operability described above may be accomplished using two layers and three versions of each header. The original version of the header may be an element within the scrollable content displayed on the scroll surface 1802. The position of the original version of the header falls wherever the display application (e.g. browser) puts it. If the content before the original version of the header grows, the position of the original version of the header moves upwardly and downwardly with the layout on the scroll surface 1802. The second and third versions of the header are copies of the original version of the header, and the second and third versions of the header may be displayed within a layer (e.g. primary content layer 1806) that is stacked on (or overlaps) the application canvas (or scroll layer) 1802. More specifically, the second version of each header may be stacked at the top of the scroll pane in a layer which has only the second and third version headers, and the third version of each header may be stacked at the bottom of the scroll pane, again in the layer which has only the second and third version headers.

Figure 20:
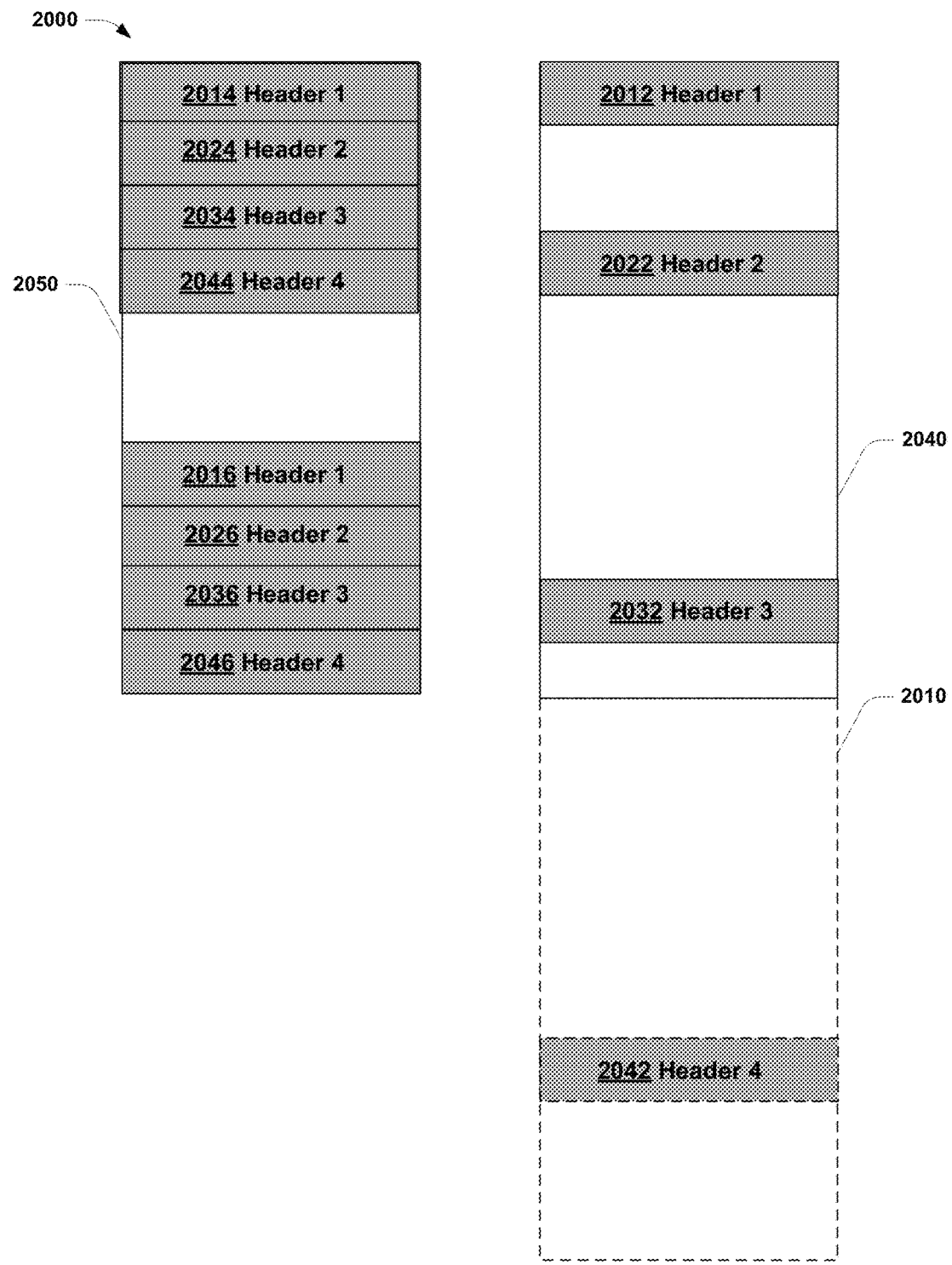
FIG. 20 shows a display environment having a scroll layer and a sticky header layer.

For example, FIG. 20 shows a display environment 2000 having a scroll layer 2010 and a sticky header layer 2050. To facilitate an understanding of various aspects of a details pane for a user interface, the scroll layer 2010 and the sticky header layer 2050 are depicted side by side (rather than overlapping). In this embodiment, there are two display layers (e.g. 2010, 2050) and three copies (or versions) of each header. The versions of the headers rendered on the sticky header layer 2050 are caused to be visible (or not visible) based on the position of the corresponding headers rendered on the scroll layer 2010. More specifically, in this embodiment, a first header 2012, a second header 2022, and a third header 2032 are displayed on the scroll layer 2010 and are visible within a details pane 2040, while a fourth header 2042 displayed on the scroll layer 2010 is positioned below the details pane 2040 and therefore would not be visible within the details pane 2040 (but is shown in FIG. 20 to facilitate an understanding of the operability of the display environment 2000).

As further shown in FIG. 20, in this embodiment, the sticky header layer 2050 includes the second and third versions of the headers shown in the scroll layer 2010. More specifically, the sticky header layer 2050 includes a second version of the first header 2014, a third version of the first header 2016, a second version of the second header 2024, a third version of the second header 2026, a second version of the third header 2034, a third version of the third header 2036, a second version of the fourth header 2044, and a third version of the fourth header 2046.

When the details pane 2040 is first rendered, the displaying application (e.g. browser) may be used to determine the locations of each header (e.g. 2012, 2022, 2032, 2042) in the scrollable content (e.g. on scroll layer 2010), and then the copies (or versions) of the headers contained in the sticky header layer 2050 are either shown or hidden based on those determined locations. In at least some implementations, the top header copies are shown if the corresponding content header is at or above the top copy header, and the bottom header copies are shown if the corresponding content headers are at or below the bottom copy header.

Figure 21:
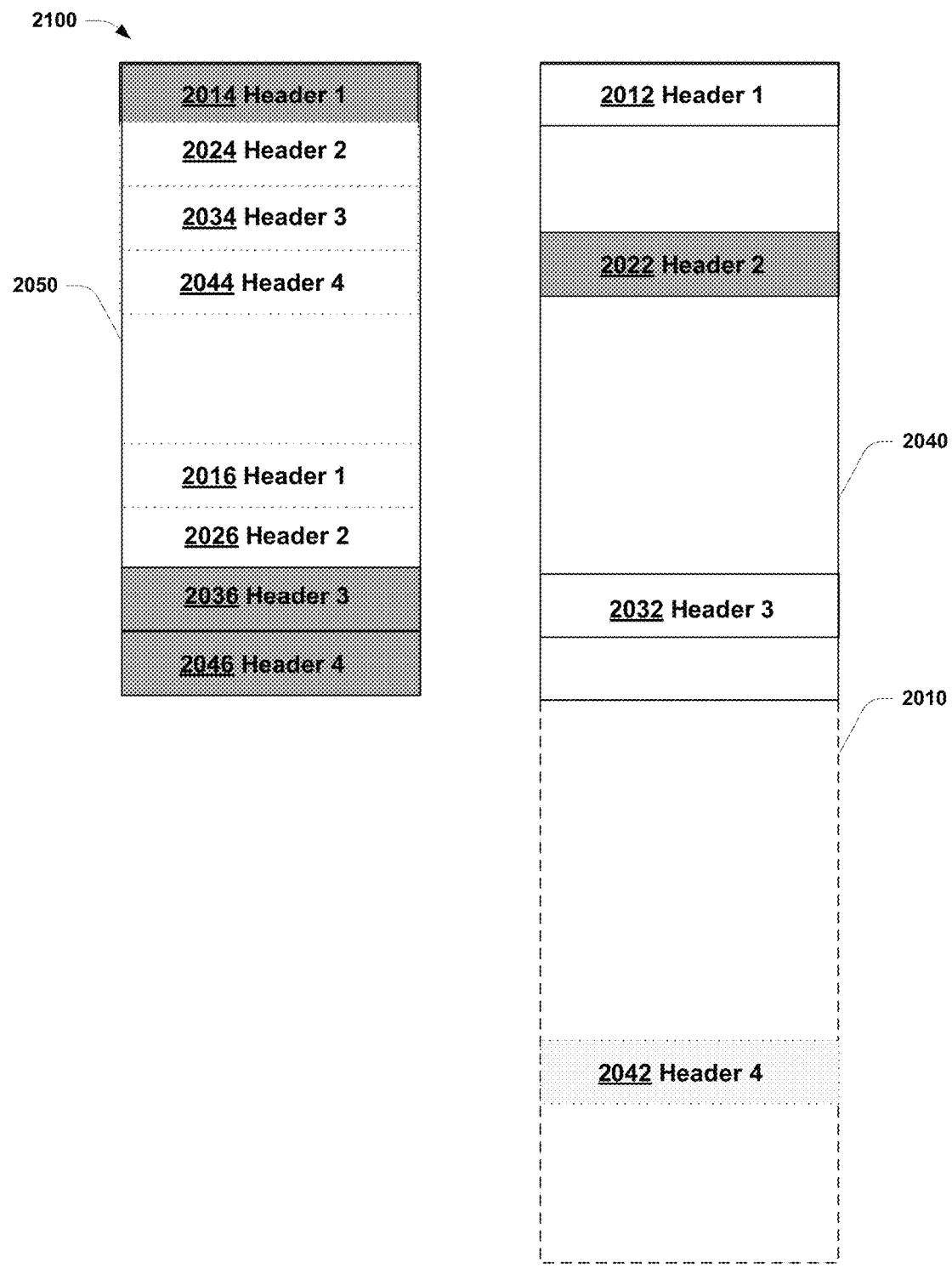
FIGS. 21-23 show the display environment of FIG. 20 in different display modes.

For example, FIG. 21 shows the display environment 2000 of FIG. 20 in a first display mode 2100. In the first display mode 2100, the first header 2012 is positioned on the scroll layer 2010 at or above the position of the corresponding second version of the first header 2014, so the second version of the first header 2014 is caused to be visible (indicated by darker color) on the sticky header layer 2050. Alternately, the second header 2022 is positioned on the scroll layer 2010 at a location within the details pane 2040 that is intermediate between the second version 2024 and the third version 2026 of the second header 2022, so both the second and third versions 2024, 2026 of the second header 2022 are not caused to be visible (indicated by the lighter color) on the sticky header layer 2050.

In the first display mode 2100, the third header 2032 is at or below the position of the third version of the third header 2036, thereby causing the second version of the third header 2034 to not be displayed on the sticky header layer 2050 (indicated by the lighter color) and causing the third version of the third header 2036 to be displayed on the sticky header layer 2050 (indicated by the darker color). Finally, the fourth header 2042 is positioned on the scroll layer 2010 below the position of the third version of the fourth header 2046, thereby causing the second version of the fourth header 2044 to not be displayed on the sticky header layer 2050 (indicated by the lighter color), and causing the third version of the fourth header 2046 to be displayed on the sticky header layer 2050 (indicated by the darker color).

Figure 22:
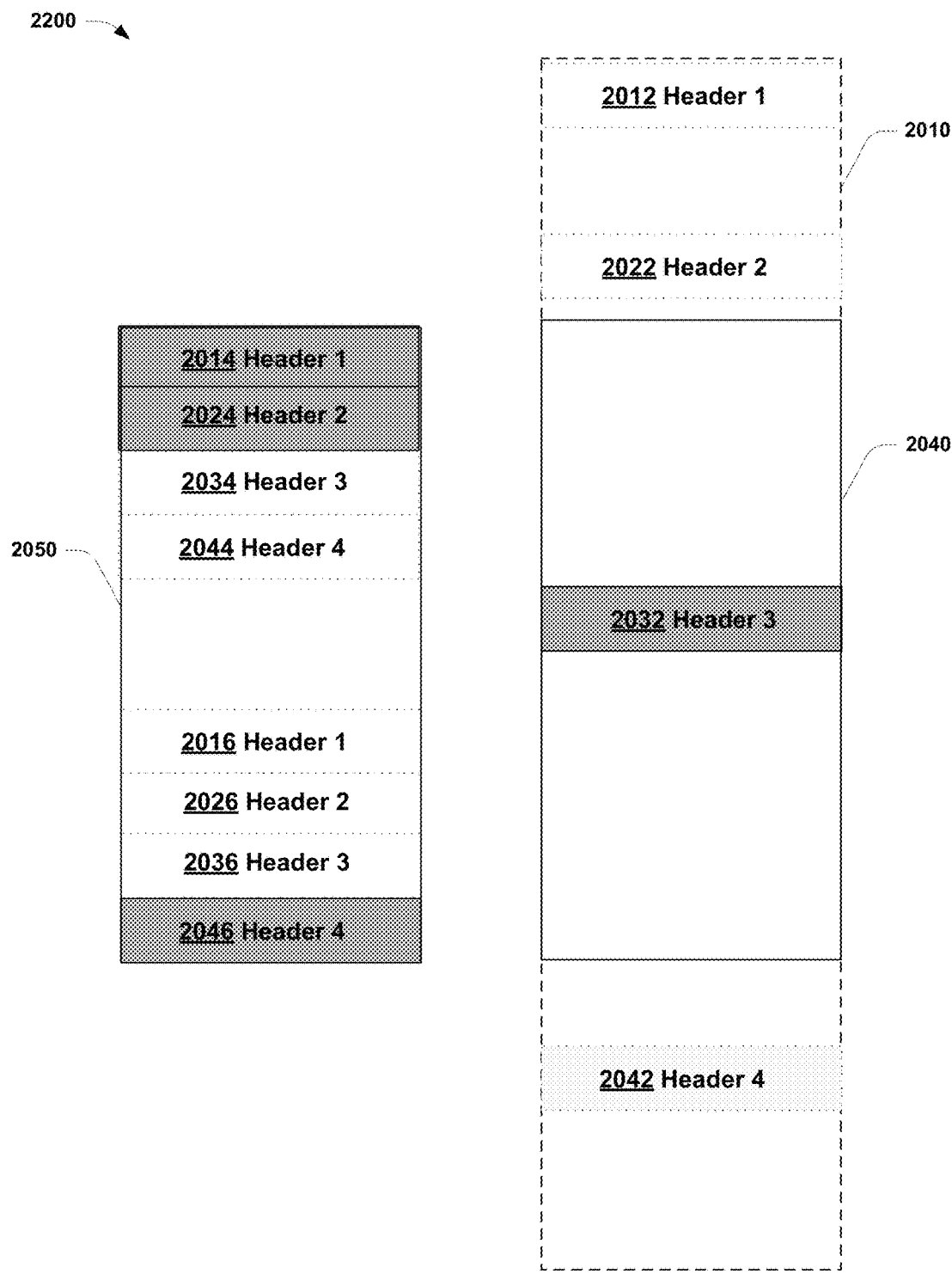

As a user scrolls, the content of the scroll layer 2010 is moved up or down with respect to the details pane 204, and the system tracks the positions of the content headers (e.g. 2012, 2022, 2032, 2042) and updates the visibilities of the header copies (or versions) contained in the sticky header layer 2050. For example, FIG. 22 shows the display environment 2000 of FIG. 20 in a second display mode 2200. In the second display mode 2200, the first header 2012 is positioned out of view of the details pane 2040 on the scroll layer 2010, at a position above the position of the corresponding second version of the first header 2014, so that the second version of the first header 2014 is caused to be visible (indicated by darker color) on the sticky header layer 2050. Similarly, the second header 2022 is positioned on the scroll layer 2010 at a location outside the details pane 2040 (and is thus not visible), and that is above the position of the second version 2024 of the second header 2022, so that the second version 2024 is caused to be visible (indicated by the darker color) and third version 2026 of the second header 2022 is caused to be not visible (indicated by the lighter color) on the sticky header layer 2050.

As further shown in FIG. 22, in the second display mode 2200, the third header 2032 is at an intermediate position within the details pane 2040 and intermediate between the positions of the second and third versions of the third header 2034, 2036, thereby causing the third header 2032 to be displayed on the scroll layer 2010 (indicated by the darker color) and causing the second and third versions 2034, 2036 to not be made visible on the sticky header layer 2050 (indicated by the lighter color). Finally, the fourth header 2042 remains at a position below the details pane 2040, and also below the position of the third version of the fourth header 2046, thereby causing the second version of the fourth header 2044 to not be displayed on the sticky header layer 2050 (indicated by the lighter color), and causing the third version of the fourth header 2046 to be displayed on the sticky header layer 2050 (indicated by the darker color).

Figure 23:
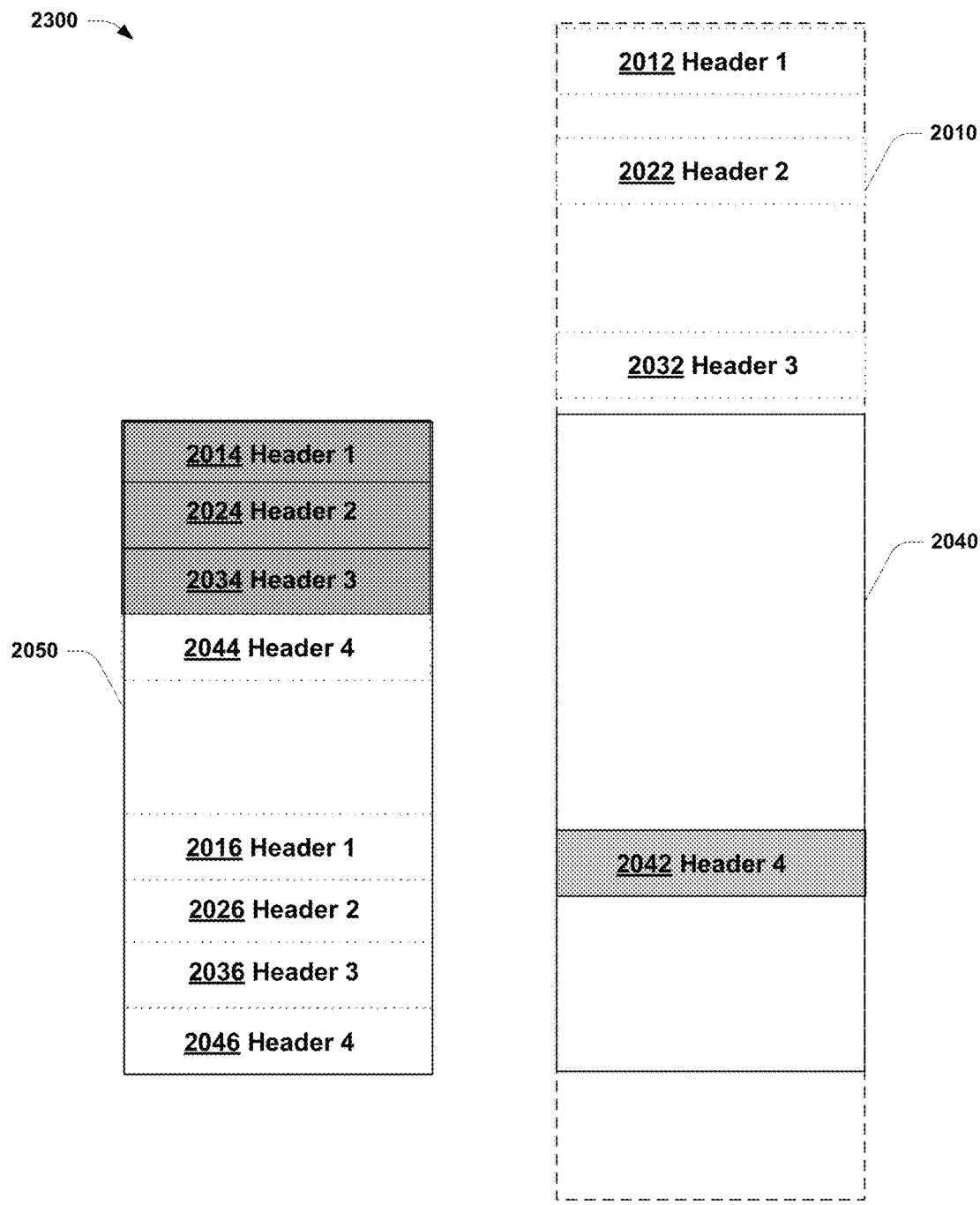

As the user continues to scroll, the system continued to track the positions of the content headers (e.g. 2012, 2022, 2032, 2042) and updates the visibilities of the header copies (or versions) contained in the sticky header layer 2050. For example, FIG. 23 shows the display environment 2000 of FIG. 20 in a third display mode 2300. As in the previously-described embodiment, the first and second headers 2012, 2014 are positioned out of view of the details pane 2040 on the scroll layer 2010, at positions above the positions of their corresponding second versions 2014, 2024, so that the second versions 2014, 2024 are caused to be visible (indicated by darker color) on the sticky header layer 2050. Similarly, the third header 2032 is positioned on the scroll layer 2010 at a location outside the details pane 2040 (and is thus not visible), and is above the position of the second version 2034 of the third header, so that the second version 2034 of the third header is caused to be visible (indicated by the darker color) and third version 2036 is caused to be not visible (indicated by the lighter color) on the sticky header layer 2050. In the third display mode 2300, the fourth header 2042 is positioned within the details pane 2040, at an intermediate position between the second and third versions 2044, 2046, so that the fourth header 2042 is visible within the details pane 2040 (indicated by the darker color), and causing the second and third versions 2044, 2046 of the fourth header to not be displayed on the sticky header layer 2050 (indicated by the lighter color).

Based on the above-described aspects of FIGS. 20-23, it will be appreciated that the original content headers 2012, 2022, 2032, 2042 remain in the scrollable content within the scroll layer 2010, and move upwardly and downwardly within the scroll layer 2010 relative to the details pane 2040, while the sticky headers within the sticky header layer 2050 are selectively made visible and not visible based on the positions of the original content headers 2012, 2022, 2032, 2042. In at least some implementations, a system simply monitors for user scroll events or re-layout events, and updates the visibility of the respective sticky headers (e.g. 2014, 2024, 2034, 2044, 2016, 2026, 2036, 2046) accordingly. When a user selects one of the visible sticky headers visible at the top or bottom of the details pane 2040, the system may respond by adjusting the content visible within the details pane 2040 (e.g. maximizing the amount of content corresponding to that selected section). For example, tapping on the second version of third header 2034 may cause the system to set the height of the content for the first and second headers 2012, 2022 to zero. In at least some implementations, this may cause the entire scrollable content area to get smaller, and the third header 2032 may align with its top copy (e.g. second version 2034). The other sticky headers on the sticky header layer 2050 may continue to be displayed or hidden based on the positions of their corresponding original content headers (e.g. 2012, 2022, 2042). Thus, in at least some implementations, the browser continues to show the correct scroll size based on the updated content.

It will be appreciated that, in at least some implementations, techniques and technologies in accordance with the present disclosure may adjust the size of the scrollable content, and sticky headers are overlayed on what may be considered a scrollable accordion panel. Such techniques and technologies advantageously reduce or eliminate the scrolling that would otherwise be required for a conventional accordion panel, which may require considerable scrolling (and associated scrolling processing cycles, processing iterations, and energy consumption) to see move between desired portions of content on the scroll layer 2010.

FIG. 8 shows an embodiment of an HTML control code 800 for a details pane of a user interface. In this implementation, the HTML control code provides an example of how to structure the controls in order to be rendered by a standard web browser (e.g. Internet Explorer®, Google Chrome®, etc.) as the layout engine (e.g. layout engine 130 of FIG. 1). As shown in FIG. 8, a "class" property of the various components (e.g. content section, header, sticky header/ surface, etc.) is used to specify CSS (Cascade Style Sheet) behaviors which provide one or more layout rules required for each component. In at least some implementations, the "id value" may be referenced by a scripting language (e.g. Javascript®, ECMAScript®, etc.) to obtain handles to each component (or control) when implementing the state mechanics.

Figure 9:
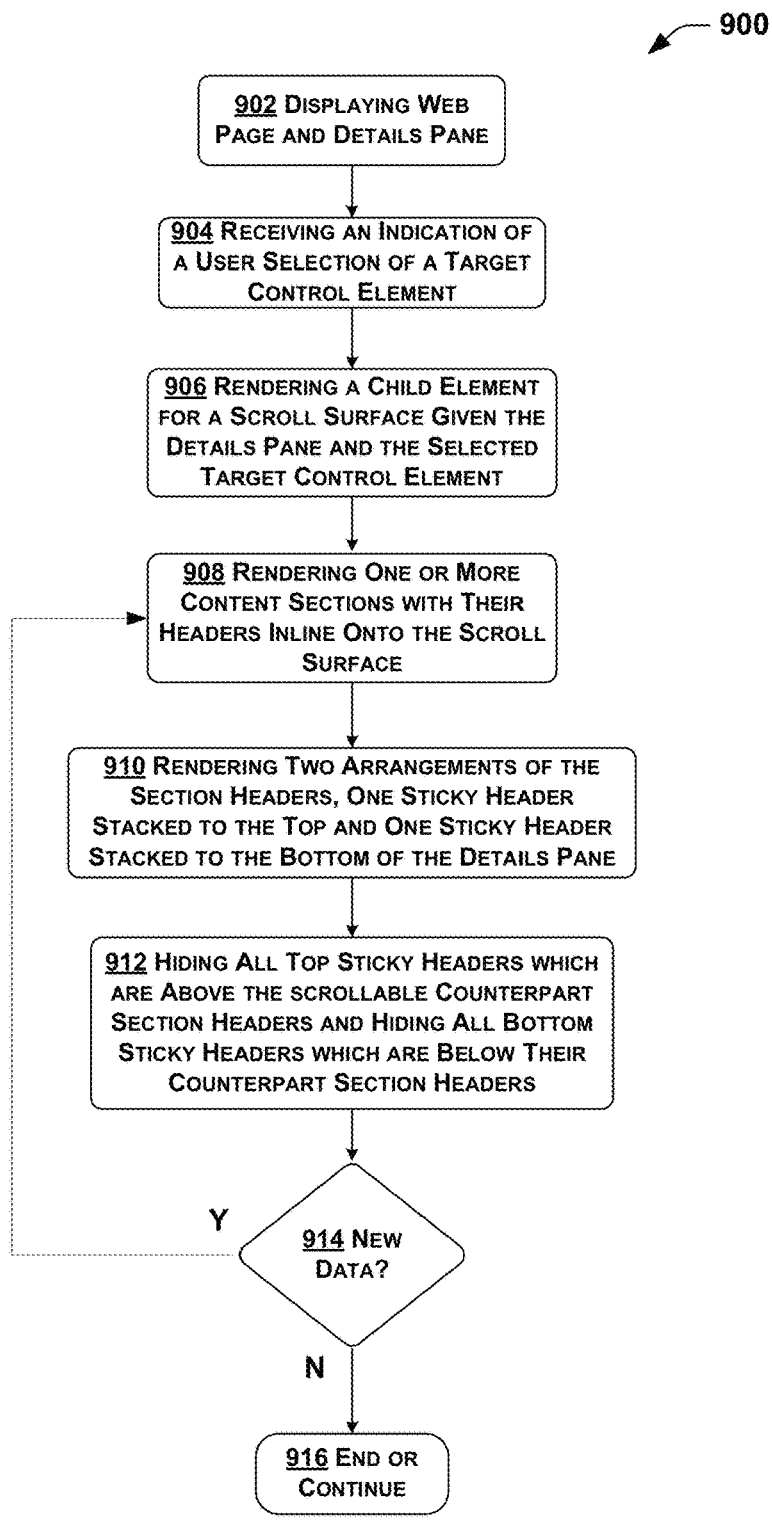
FIG. 9 shows an embodiment of a process for operating a details pane of a user interface.

FIG. 9 shows an embodiment of a process 900 for operating a details pane of a user interface in an initial state. In this embodiment, the process 900 includes displaying a web page and a details pane at 902. In at least some implementations, in an initial state of the details pane, no content is yet rendered within the details pane.

The process 900 may further include receiving an indication of a user selection of a target control element at 904. For example, the user may select the selected item 127 from the list of displayed items 125 in the user interface 124 of FIG. 1, or may select one of the selectable items 212 from the user interface 210 shown in FIG. 2. Alternately, in at least some implementations, this operation may be omitted, or selection of a target control element may occur in other ways, such as by default or random selection, or through indication or prescription by the web page being displayed, or by any other suitable way.

As further shown in FIG. 9, the process 900 further includes rendering a child element for a scroll surface given the details pane and the selected target control element at 906. For example, in at least some implementations, initial rendering of a child element (e.g. section 362 of FIG. 3) may be performed by a layout engine (e.g. layout engine 130 of FIG. 1) given initial input data corresponding to the selected target control element (e.g. selected list item 127). At 908, the process 900 includes rendering one or more content sections with their headers inline onto the scroll surface. More specifically, in at least some implementations, the rendering at 908 includes receiving one or more handles to the one or more content section controls, and also one or more handles to their corresponding section header controls.

The process 900 further includes rendering two arrangements of the section headers, one sticky header stacked to the top and one sticky header stacked to the bottom of the details pane at 910. For example, in at least some implementations, the layout engine may copy each section header twice, creating one top-aligned sticky header (e.g. top sticky header 422 of FIG. 4) and one bottom-aligned sticky header (e.g. bottom sticky header 432). The layout engine may render the top-aligned sticky headers into a control aligned with the top of the details pane (e.g. the top position 425), and may render the bottom-aligned sticky headers into a control aligned with the bottom of the details pane (e.g. the bottom position 435). These two positioning controls may be rendered in front of the scroll surface. The layout engine may maintain one or more handles to all of the sticky header controls.

As shown in FIG. 9, the process 900 further includes hiding all top sticky headers which are above their scrollable counterpart section headers, and hiding all bottom sticky headers which are below their counterpart section headers at 912. At 914, the process 900 determines whether new data is available to be rendered into the scroll surface. If so, the process 900 returns to operation 908, and operations 908 through 914 are repeated indefinitely until no new data is available. Once it is determined that there is no new data to be rendered into the scroll surface (at 914), then the process 900 ends or continues to other operations at 916.

Figure 10:
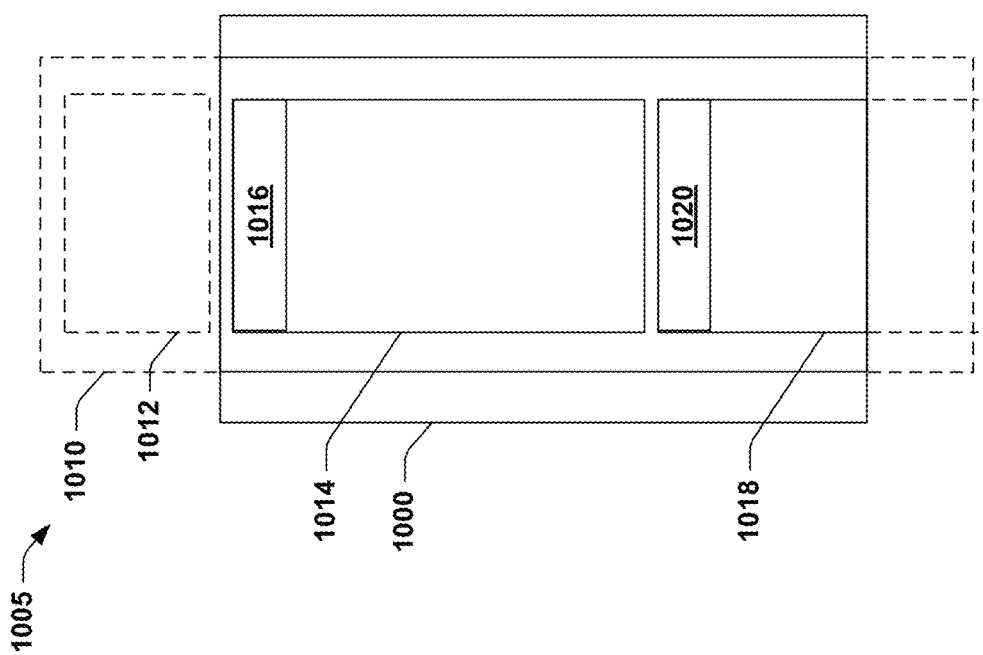

After a details pane has completed an initial process (e.g. process 900), the details pane may proceed to a scrollable state. In a scrollable state, all content sections are rendered into the scroll surface, and the scroll surface is rendered within the details pane. For example, FIG. 10 shows an embodiment of a details pane 1000 in a first scrollable state 1005 before an animated scroll occurs. In the first scrollable state 1005, a first content section (or child element) 1012, a second content section 1014, and a third content section 1018 are rendered within a scroll surface 1010, and the scroll surface 1010 is rendered within the details pane 1000 such that the second section 1014 is fully within view in the details pane 1000 but the third section 1018 is only partially within view. In the embodiment shown in FIG. 10, a first section header 1016 of the second content section 1014, and a second section header 1020 of the third content section 1018 are visible within the details pane 1000.

As the user performs one or more scroll actions, in at least some implementations, all section headers (and corresponding sticky headers) are re-evaluated for their visibility based on their positions within the scroll surface 1010 and within the details pane 1000. In at least some implementations, at most one of the two sticky headers associated with a given section header is ever visible at a given moment. If a section header (e.g. 1016, 1020) is rendered positionally between its two sticky headers, then neither sticky header is made visible to the user.

In at least some implementations, if a scrolling action by a user is detected, then the positions of the section headers are determined (e.g. using a layout engine), and the visibility of one or more sticky headers are adjusted based on the position of the associated section headers. Alternately, in at least some implementations, if the user performs a click action on a section header, then the layout engine may (1) determine the offset of the upper bound of the given section header from the top of the scroll surface, and (2) animate the scroll position of the scroll surface to match the offset of the section header.

More specifically, in at least some implementations, when the second section header 1020 is clicked, the scrollable area may animate so that the third section 1018 moves upwardly into view, with a sticky header corresponding to the second section header 1016 appearing at the top of the details pane 1000 (its uppermost available visible position), and with the second section header 1020 moving upwardly to immediately below the sticky header (its uppermost available visible position).

Figure 11:
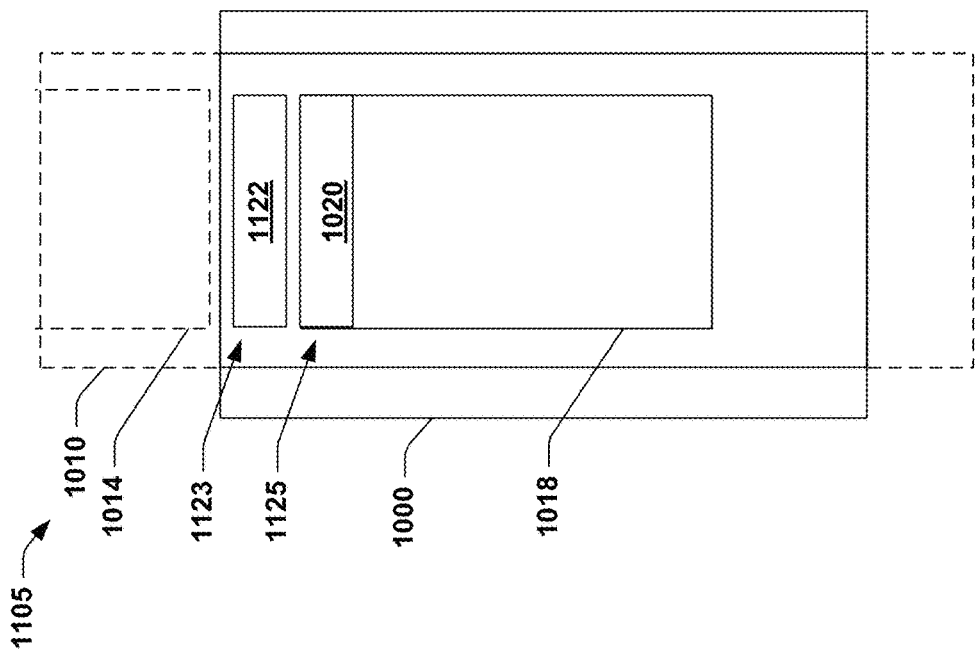
FIGS. 10, 11, and 11B show embodiments of a details pane of a user interface in various operational states.

For example, FIG. 11 shows the details pane 1000 of FIG. 10 in a second scrollable state 1105 after an animated scroll occurs. In this embodiment, the user has clicked on the second section header 1020 to initiate animation to the second scrollable state 1105 such that the second content section 1014 has risen out of view above the details pane 1000, and the third content section 1018 has risen upwardly and is fully within view in the details pane 1000. With the first section header 1016 of the second content section 1014 out of view above the details pane 1000, a first sticky header 1122 corresponding to the first section header 1016 is rendered at a top position 1123 of the details pane 1000. It will be appreciated that, in the embodiment shown in FIG. 11, the top position 1123 is an uppermost available position (for the first section header 1016) that is visible within the details pane 1000.

The second section header 1020 of the third content section 1018 remains visible within the details pane 1000 at a second uppermost position 1125 immediately below the first sticky header 1122, and the third content section 1018 has risen into view within the details pane 1000. It will be appreciated that, in the embodiment shown in FIG. 11, the second uppermost position 1125 is an uppermost available position for the second section header 1020 that is visible within the details pane 1000. Accordingly, the embodiment shown in FIG. 11 shows that each section header (e.g. headers 1016, 1020) may have a different corresponding uppermost available position depending on whether other section headers (or the preview layer 1804) are made visible within the details pane above them. Similarly, it will be appreciated that each section header (e.g. headers 1016, 1020) may have a different corresponding lowermost available position depending on whether other section headers are made visible within the details pane below them, as discussed above with respect to FIGS. 20-23.

Figure 11B:
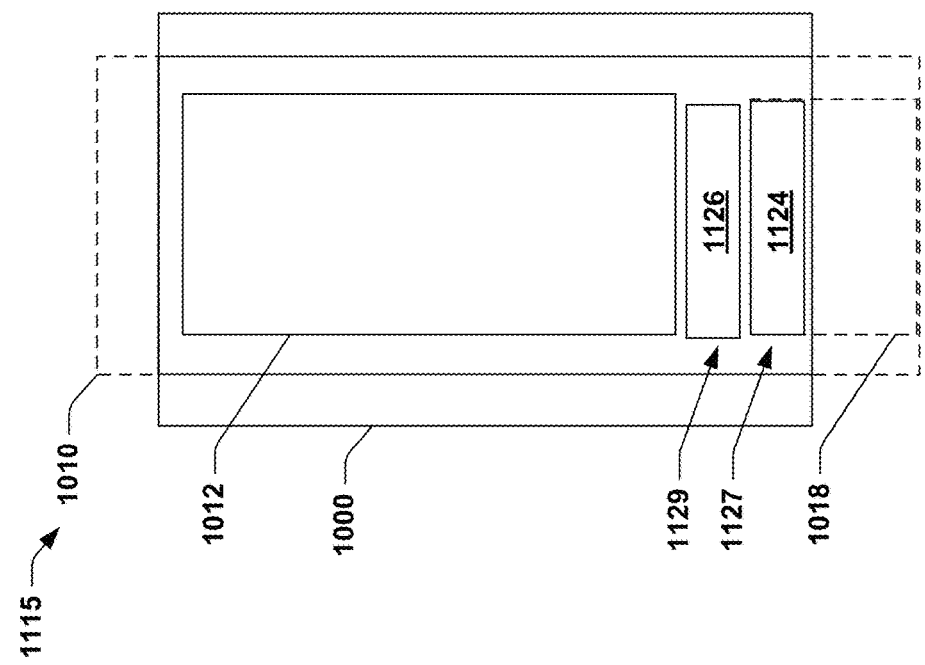

FIG. 11B shows the details pane 1000 of FIG. 10 in a third scrollable state 1115. In this embodiment, the user has scrolled upwardly (moving the sections downwardly) so that the first content section 1012 is visible within the details pane 1000, but the second content section 1014 and the third content section 1018 are out of view below the details pane 1000. With the second section header 1020 of the third content section 1014 out of view below the details pane 1000, a first bottom sticky header 1124 corresponding to the second section header 1020 is rendered at a bottom position (or first lowermost available position) 1127 of the details pane 1000. Similarly, with the first section header 1016 of the second content section 1014 out of view below the details pane 1000, a second bottom sticky header 1126 corresponding to the first section header 1016 is rendered at a second bottom position (or second lowermost available position) 1129 of the details pane 1000.

Figure 12:
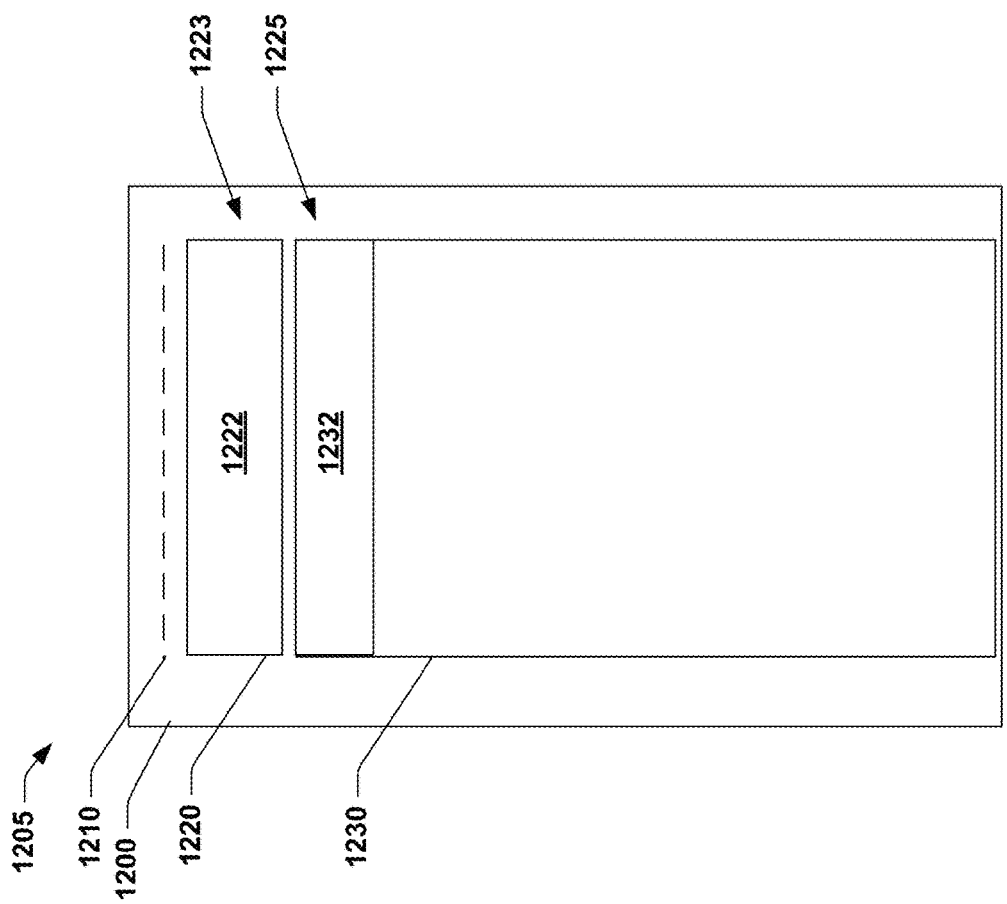
FIG. 12 shows an embodiment of a scroll surface in a modality state of operation.

In at least some implementations, a scroll surface of a details pane in accordance with the present disclosure may also operate in a modality state of operation. FIG. 12 shows an embodiment of a scroll surface 1200 in a modality state 1205. In this embodiment, a first section 1210 is rendered with zero height (i.e. is not visible but depicted as a dashed line), and a second section 1220 is rendered at a height equal to its associated first sticky header 1222. A third section 1230 having a second sticky header 1232 is also rendered on the scroll surface 1200. In the embodiment shown in FIG. 12, the second section 1220 and the third section 1230 are configured to operate in a modality mode of operation as described below. It will be appreciated that, in the embodiment shown in FIG. 12, the first sticky header 1222 is rendered and made visible at its uppermost available position 1223 that is visible within the details pane 1200, and the second sticky header 1232 is rendered and made visible at its uppermost available position 1225 that is visible within the details pane 1200. In at least some implementations, the height of the third section 1230 is automatically adjusted to fill the remaining available visible area within the details pane 1200.

Figure 13:
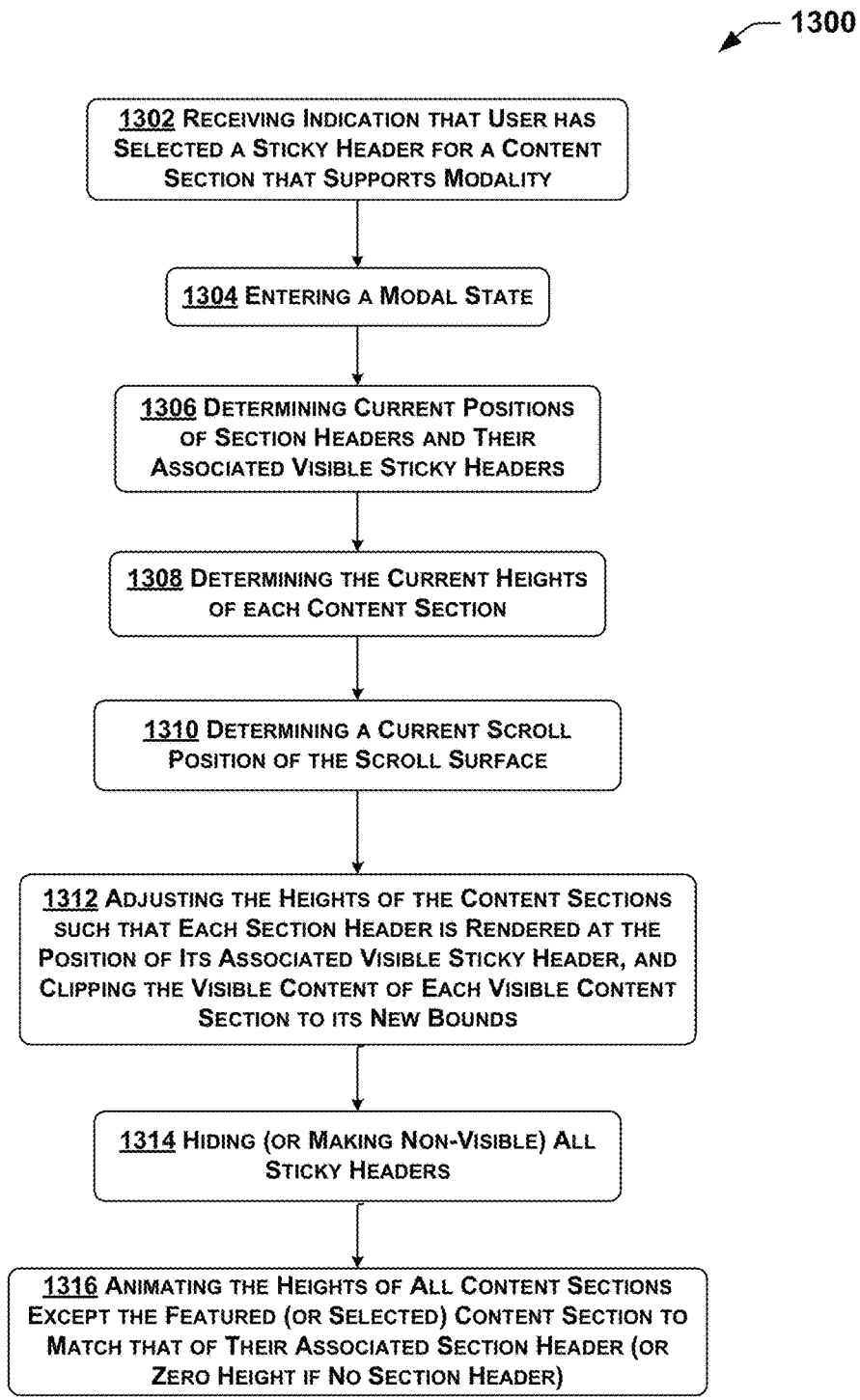
FIG. 13 shows an embodiment of a process of entering a modality mode of operation.

FIG. 13 shows an embodiment of a process 1300 for entering a modality mode of operation. More specifically, in this embodiment, the process 1300 includes receiving an indication that a user has selected (e.g. clicked on) a sticky header for a content section that supports modality at 1302, and entering a modal state at 1304. At 1306, the process 1300 includes determining (e.g. recording, storing, etc.) the current positions of each section header and their associated visible sticky headers. The process 1300 further includes determining (e.g. recording, storing, etc.) the current heights of each content section at 1308, and determining a current scroll position of the scroll surface at 1310.

At 1312, the process 900 includes adjusting (e.g. instantaneously or non-instantaneously) the heights of the content sections such that each section header is rendered (e.g. by the layout engine) at the position of its associated visible sticky header, and clipping the visible content of each visible content section to its new bounds (e.g. the new bounds being determined based on the appearance(s) of one or more sticky headers within the details pane as discussed above with respect to FIGS. 20-23). The process 900 further includes hiding (or making non-visible) all sticky headers at 1314, and animating the heights of all content sections except the featured (or selected) content section to match that of their associated section header (or zero height if no section header) at 1316. In at least some implementations, the animating the heights (at 1316) further includes automatically adjusted the height of the selected content section to fill the remaining available visible area within the details pane.

In the modal state, it will be appreciated that, in at least some implementations, only one content section (e.g. the selected or featured content section) retains its normal layout size within the scroll surface. All other content sections are reduced in height (at 1316) to that of their associated section headers (or, in the case of a content section without a section header, no height). In this way, in at least some implementations, the content sections may be said to appear to display an "accordion"-like behavior, with the selected section expanded to its full extent and the other sections contracted to their minimum extend (e.g. the heights of their associated sticky headers). In at least some implementations, in the modal state, all sticky headers continue to have their visibility adjusted based on the positions of their associated section headers. In at least some implementations, only top-aligned sticky headers will be visible in the modal state, since their associated section headers may always be above them.

Figure 14:
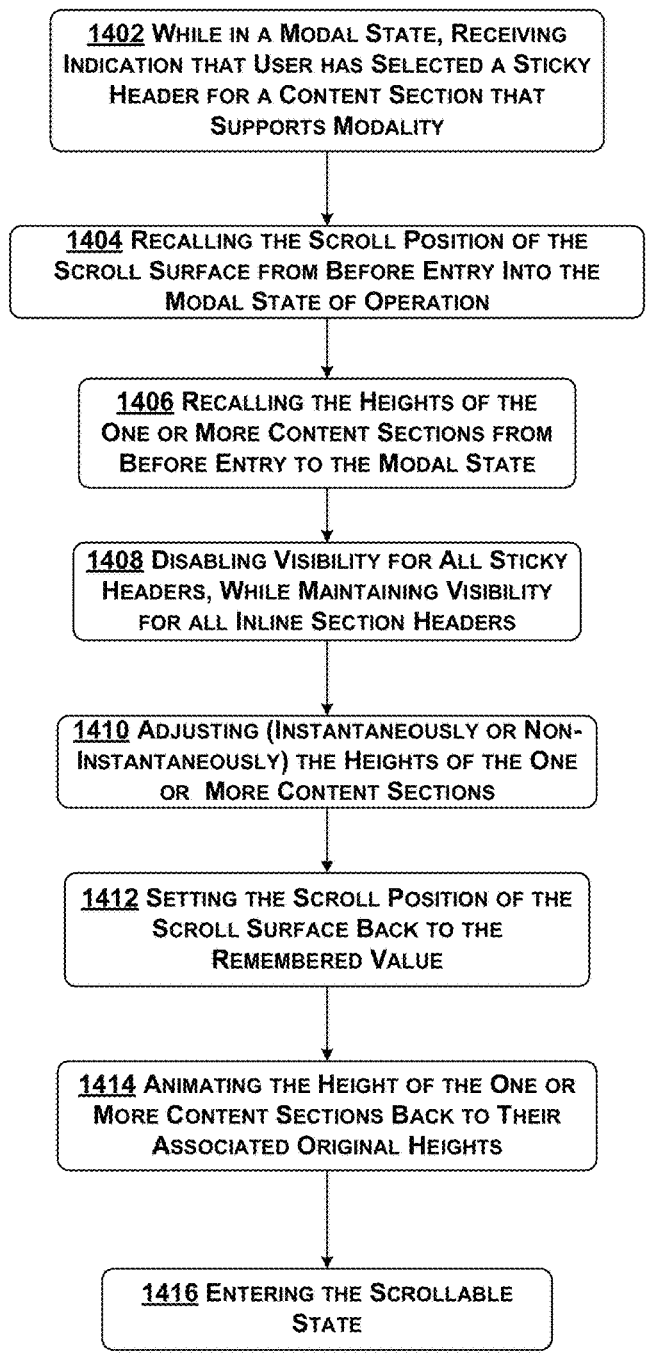
FIG. 14 shows an embodiment of a process of returning from a modality mode of operation.

FIG. 14 shows an embodiment of a process 1400 for returning from a modality mode of operation. More specifically, in this embodiment, the process 1400 includes, while in a modal state of operation, receiving an indication that a user has selected a sticky header for a content section that supports modality at 1402. At 1404, the process 1400 includes recalling the scroll position of the scroll surface from before entry into the modal state of operation. The process 1400 further includes recalling the heights of the one or more content sections from before entry to the modal state at 1406. At 1408, the process 1400 includes disabling visibility for all sticky headers while maintaining visibility for all inline section headers.

The process 1400 further includes adjusting (instantaneously or non-instantaneously) the heights of the one or more content sections at 1410. More specifically, in at least some implementations, adjusting the heights of the one or more content sections at 1410 includes, if the content section can be restored to its original height without its bottom bound exceeding the remembered scroll position, it is restored to its original height, but if the content section cannot be restored to its original height without exceeding the scroll position, adjusting its height such that its bottom bound matches the scroll position.

As further shown in FIG. 14, the process 1400 further includes setting the scroll position of the scroll surface back to the remembered value at 1412. At 1414, the process 1400 includes animating the height of the one or more content sections back to their associated original heights, and at 1416, entering the scrollable state.

Figure 15:
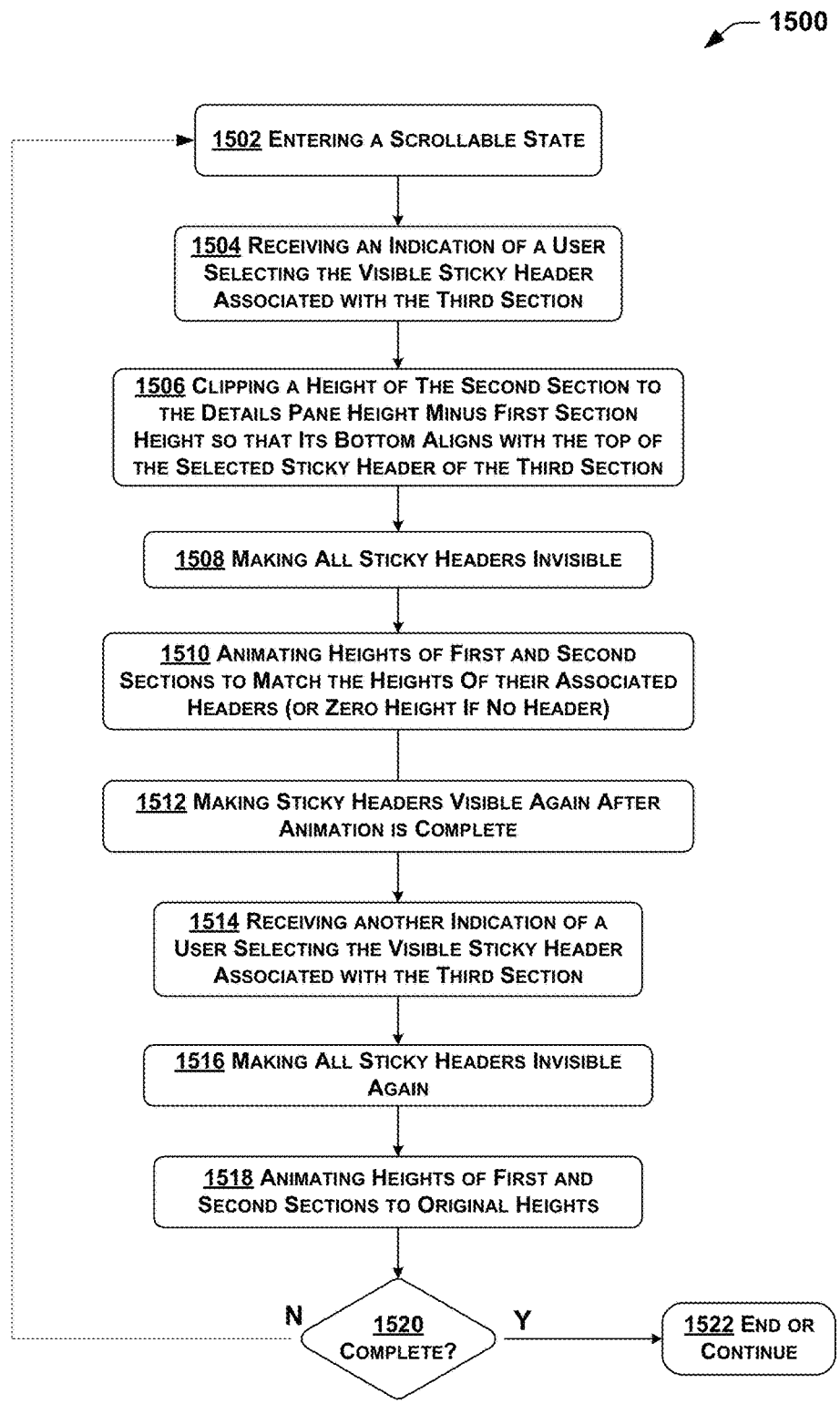
FIG. 15 shows an embodiment of a process of operating in a scrolling mode of operation.

FIG. 15 shows an embodiment of a process 1500 of operating in a scrolling mode of operation. In this embodiment, the process 1500 is described with reference to the scroll surface 1200 shown in FIG. 12. In at least some implementations, the process 1500 may be performed using a layout engine (e.g. layout engine 130), or a user interface component (e.g. UI component 122), or other suitable components or circuitry.

As shown in FIG. 15, the process 1500 includes entering a scrollable state at 1502, and receiving an indication of a user selecting the second sticky header 1232 associated with the third section 1230 at 1504. At 1506, the process 1500 includes clipping a height of the second section 1220 (visible above the third section 1230) to the details pane height (e.g. details pane 1000) minus the first section height (e.g. first section 1210, first section 1012, etc.) so that its bottom aligns with the top of the selected sticky header 1232 of the third section 1230.

As further shown in FIG. 15, the process 1500 further includes making all sticky headers invisible at 1508, and animating heights of the first and second sections to match the heights of their associated headers (or zero height if no header) at 1510. The process 1500 includes making sticky headers visible again after animation is complete at 1512.

The process 1500 further includes receiving another indication of a user selecting the second sticky header 1232 associated with the third section 1230 at 1514, and making all sticky headers invisible again at 1516. At 1518, the process 1500 includes animating heights of first and second sections to their original heights. The process 1500 includes determining whether scrolling operations are complete at 1520. If not, the process 1500 returns to operations 1502 and repeats operations 1502 through 1518 indefinitely until scrolling operations are complete. Once it is determined (at 1520) that scrolling operations are complete, then the process 1500 ends or continues to other operations at 1522.

Figure 16:
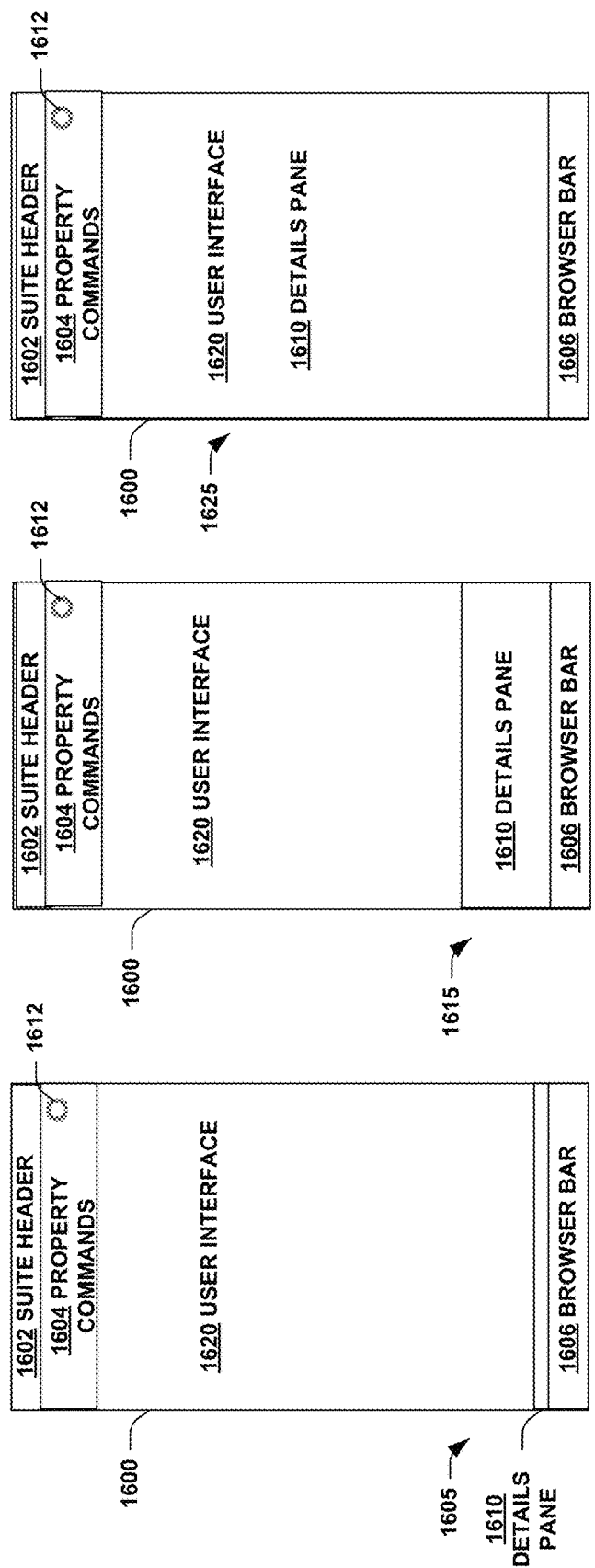
FIG. 16 shows and embodiment of a mobile device environment for a details pane of a user interface.

FIG. 16 shows an embodiment of a mobile device environment for a details pane of a user interface. More specifically, FIG. 16 shows a mobile device 1600 having a user interface 1620 operating in a first user interface state 1605, a second user interface state 1615, and a third user interface state 1625. In the first user interface state 1605, the user interface 1620 of the mobile device 1600 displays a suite header 1602, a property commands header 1604, and a browser bar 1606. The property commands header 1604 includes a details pane control 1612. In the first user interface state 1605, a relatively small portion (e.g. "sliver") of a details pane 1610 is visible in the user interface 1620. Similarly, in a second user interface state 1615, a relatively larger portion (e.g. "hint") of the details pane 1610 is visible, while in a third user interface state 1625, a substantially full size portion of the details pane 1610 is visible in the user interface 1620. In at least some implementations, if there is unseen activity that causes a particular section to be updated, a "sliver" or "hint" of the details pane 1620 may automatically appear visible to the viewer to make it more discoverable.

More specifically, in at least some implementations, the details pane control 1612 may be a persistent entry point in all views or modes of the user interface 1620 of the mobile device 1600 to invoke or dismiss the details pane 1610. In at least some implementations, for example, in a mobile web application, there may also be "sliver" and "hint" states 1605, 1615 of the details pane 1610 proximate the bottom of the user interface 1620. For embodiments having a contact-sensitive user interface 1620, a tap or swipe up may bring up the full instance 1625 of the details pane 1610.

In at least some embodiments of a details pane of a user interface in accordance with the present disclosure, items selected by a user (e.g. list item 127, selectable items 212, etc.), such as files, folders, or other selectable items may be displayed and may provide much more information than the content contained within the item itself. For example, in at least some implementations, a details pane in accordance with the present disclosure may provide information that facilitates collaboration by multiple users of an item or asset, which may be provided in one or more content sections of the scroll surface. Such information may include, for example, information relevant to contributions and changes by various users to a common file or other editable data structure.

In addition, in at least some implementations, a details pane in accordance with the present disclosure may ensure that users will be able to find, return to, and leverage related data and functionality across all potential file types. In at least some implementations, a details pane for user interfaces for user applications may operate using sliding panels, showing both activity and metadata, with specific behaviors for various scroll states and invocation methods.

It will be appreciated that techniques and technologies for details panes in accordance with the present disclosure may provide considerable advantages over convention systems. For example, in at least some implementations, because the details pane provides a multi-sectioned surface with a variety of information types and functionalities, techniques and technologies in accordance with the present disclosure may reduce or alleviate problems associated with conventional systems wherein users cannot quickly access information they care about without having to scroll repeatedly and numerous times through other content. Thus, techniques and technologies in accordance with the present disclosure may advantageously improve the efficiency and operability of a computing system in terms of fewer processing cycles and reduced power consumption in comparison with conventional systems.

In addition, techniques and technologies for a details pane in accordance with the present disclosure may advantageously reduce or alleviate problems associated with conventional systems which use a tabbed design to toggle between different sets of information in the details pane. Such conventional systems do not optimize the use of space if there is little information to show on the first surface. Techniques and technologies for details panes in accordance with the present disclosure may provide improved optimization of space for enabling improved accessing of primary and secondary information, including enabling users to review activity and comments on files, and also quickly access metadata and other related information. In at least some implementations, a details pane in accordance with the present disclosure may optimize use of the area of the details pane such that if there is little information to show on a first section, a second section automatically fills the gap. Also, in at least some implementations, if there is unseen activity that causes a particular section to be updated, a details pane "sliver" or "hint" may automatically appear visible to the viewer to make it more discoverable.

In general, techniques and technologies disclosed herein for a details pane of a user interface may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Figure 17:
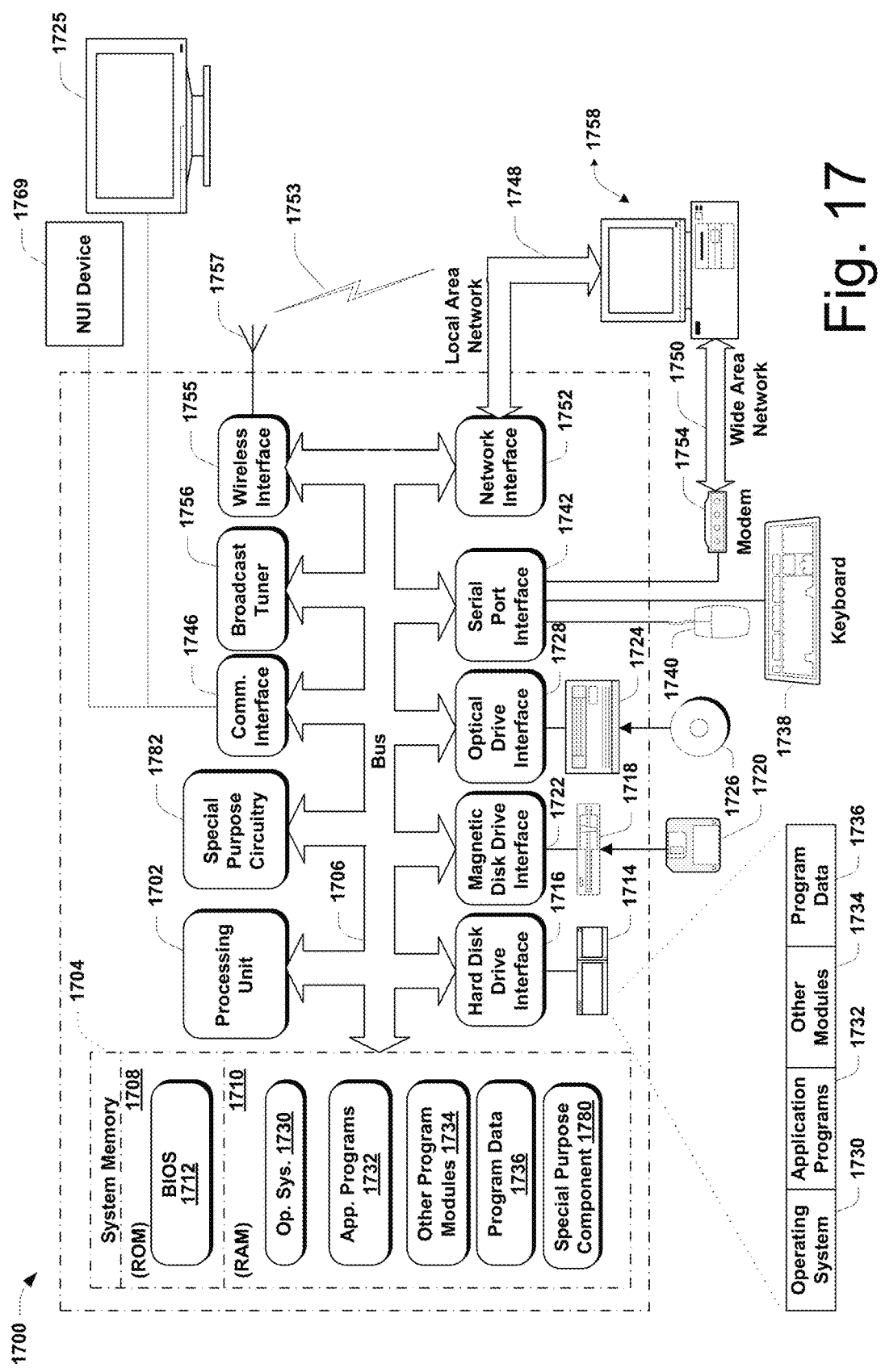
FIG. 17 shows an embodiment of a computing device environment for a details pane of a user interface.

Furthermore, techniques and technologies disclosed herein for a details pane of a user interface may be implemented on a wide variety of devices and platforms. For example, FIG. 17 shows an embodiment of a computer system 2100 that may be employed for implementing a details pane of a user interface (e.g. user interface 1769) in accordance with the present disclosure. As shown in FIG. 17, the example computer system environment 1700 includes one or more processors (or processing units) 1702, special purpose circuitry 1782, memory 1704, and a bus 1706 that operatively couples various system components, including the memory 1704, to the one or more processors 1702 and special purpose circuitry 1782 (e.g., Application Specific Integrated Circuitry (ASIC), Field Programmable Gate Array (FPGA), etc.).

The bus 1706 may represent one or more of any of several types of bus structures, including a memory bus or memory controller, a peripheral bus, an accelerated graphics port, and a processor or local bus using any of a variety of bus architectures. In at least some implementations, the memory 1704 includes read only memory (ROM) 1708 and random access memory (RAM) 1710. A basic input/output system (BIOS) 1712, containing the basic routines that help to transfer information between elements within the system 1700, such as during start-up, is stored in ROM 1708.

The example system environment 1700 further includes a hard disk drive 1714 for reading from and writing to a hard disk (not shown), and is connected to the bus 1706 via a hard disk driver interface 1716 (e.g., a SCSI, ATA, or other type of interface). A magnetic disk drive 1718 for reading from and writing to a removable magnetic disk 1720, is connected to the system bus 1706 via a magnetic disk drive interface 1722. Similarly, an optical disk drive 1724 for reading from or writing to a removable optical disk 1726 such as a CD ROM, DVD, or other optical media, connected to the bus 1706 via an optical drive interface 1728. The drives and their associated computer-readable media may provide nonvolatile storage of computer readable instructions, data structures, program modules and other data for the system environment 1700. Although the system environment 1700 described herein employs a hard disk, a removable magnetic disk 1720 and a removable optical disk 1726, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 1700 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 17, a number of program modules may be stored on the memory 1704 (e.g., the ROM 1708 or the RAM 1710) including an operating system 1730, one or more application programs 1732, other program modules 1734, and program data 1736 (e.g., the data store 1720, image data, audio data, three dimensional object models, etc.). Alternately, these program modules may be stored on other computer-readable media, including the hard disk, the magnetic disk 1720, or the optical disk 1726. For purposes of illustration, programs and other executable program components, such as the operating system 1730, are illustrated in FIG. 17 as discrete blocks, although it is recognized that such programs and components reside at various times in different storage components of the system environment 1700, and may be executed by the processor(s) 1702 or the special purpose circuitry 1782 of the system environment 1700.

A user may enter commands and information into the system environment 1700 through input devices such as a keyboard 1738 and a pointing device 1740. Other input devices (not shown) may include a microphone, joystick, game pad, satellite dish, scanner, or the like. Still other input devices, such as a Natural User Interface (NUI) device 1769, or user interface 1725, include or involve one or more aspects of a Natural User Interface (NUI) that enables a user to interact with the system environment 1700 in a "natural" manner, free from artificial constraints imposed by conventional input devices such as mice, keyboards, remote controls, and the like. For example, in at least some embodiments, the NUI device 1769 may rely on speech recognition, touch and stylus recognition, one or more biometric inputs, gesture recognition both on screen and adjacent to the screen, air gestures (e.g. hand movement, wave, point, snap, nod, finger gesture, etc.), head and eye (or gaze) tracking, voice and speech, vision, touch, hover (e.g. maintaining position of finger or stylus proximate to a relevant portion of an interface or other location for a specified period, etc.), facial or body gestures, machine intelligence (e.g. pattern recognition, Bayesian learning algorithms, inductive learning algorithms, inference algorithms, etc.), as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 1702 and special purpose circuitry 1782 through an interface 1742 or a communication interface 1746 (e.g. video adapter) that is coupled to the system bus 1706. A user interface 1725 (e.g., display, monitor, or any other user interface device) may be connected to the bus 1706 via an interface, such as a video adapter 1746. In addition, the system environment 1700 may also include other peripheral output devices (not shown) such as speakers and printers.

The system environment 1700 may operate in a networked environment using logical connections to one or more remote computers (or servers) 1758. Such remote computers (or servers) 1758 may be a personal computer, a server, a router, a network PC, a peer device or other common network node. The logical connections depicted in FIG. 17 include one or more of a local area network (LAN) 1748 and a wide area network (WAN) 1750. Such networking environments are commonplace in offices, enterprise-wide computer networks, intranets, and the Internet. In this embodiment, the system environment 1700 also includes one or more broadcast tuners 1756. The broadcast tuner 1756 may receive broadcast signals directly (e.g., analog or digital cable transmissions fed directly into the tuner 1756) or via a reception device (e.g., via an antenna 1757, a satellite dish, etc.).

When used in a LAN networking environment, the system environment 1700 may be connected to the local area network 1748 through a network interface (or adapter) 1752. When used in a WAN networking environment, the system environment 1700 typically includes a modem 1754 or other means (e.g., router) for establishing communications over the wide area network 1750, such as the Internet. The modem 1754, which may be internal or external, may be connected to the bus 1706 via the serial port interface 1742. Similarly, the system environment 1700 may exchange (send or receive) wireless signals 1753 with one or more remote devices using a wireless interface 1755 coupled to a wireless communicator 1757 (e.g., an antenna, a satellite dish, a transmitter, a receiver, a transceiver, a photoreceptor, a photodiode, an emitter, a receptor, etc.).

In a networked environment, program modules depicted relative to the system environment 1700, or portions thereof, may be stored in the memory 1704, or in a remote memory storage device. More specifically, as further shown in FIG. 17, a special purpose component 1780 may be stored in the memory 1704 of the system environment 1700. The special purpose component 1780 may be implemented using software, hardware, firmware, or any suitable combination thereof. In cooperation with the other components of the system environment 1700, such as the processing unit 1702 or the special purpose circuitry 1782, the special purpose component 1780 may be operable to perform one or more implementations of techniques and technologies described above (e.g., FIGS. 1-16 and FIGS. 18-23).

Generally, application programs and program modules executed on the system environment 1700 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for a details pane of a user interface as disclosed herein, a few representative embodiments are summarized below. It should be appreciated that the representative embodiments described herein are not intended to be exhaustive of all possible embodiments, and that additional embodiments may be readily conceived from the disclosure of techniques and technologies provided herein.

For example, in at least some implementations, a system comprises: a processing component operatively coupled to a memory; a user interface component at least partially stored on the memory, the user interface component including one or more instructions executable by the processing component configured to perform one or more operations including at least: rendering a user interface including a details pane for display on a display device; rendering a content section at least partially viewable within the details pane, the content section being scrollably moveable with respect to the details pane, the content section including a section header; monitoring a location of the section header as the content section is scrollably moved with respect to the details pane; when the location of the section header is above an uppermost available position that is visible within the details pane, causing an upper sticky header that is a duplicate of the section header to be visible at the uppermost available position and causing the section header to not be visible; when the location of the section header is below a lowermost available position that is visible within the details pane, causing a lower sticky header that is another duplicate of the section header to be visible at the lowermost available position and causing the section header to not be visible; and when the location of the section header is at or below the uppermost available position and at or above the lowermost available position, causing the section header to be visible and causing the upper sticky header and the lower sticky header to not be visible.

In at least some implementations, a system is further configured to receive an input indicative of a user selection of at least one of the upper sticky header or the lower sticky header; and adjust a size of a scrollable content within the details pane based on the user selection. In further implementations, the content section is rendered on a scroll surface and the upper and lower sticky headers are rendered on a sticky header layer that is different from the scroll surface. In at least some implementations, rendering a scroll surface comprises rendering a scroll surface that extends beyond an upper bound of the details pane and that extends beyond a lower bound of the details pane. In some other implementations, rendering a scroll surface comprises rendering a scroll surface that is scrollably moveable in an upward direction and in a downward direction with respect to the details pane. In still other implementations, the user interface component further includes one or more instructions executable by the processing component configured to perform one or more operations comprising: receiving an input indicative of a user performing a scrolling operation; and moving the content section relative to the details pane responsive to the input indicative of the user performing the scrolling operation.

In at least some further implementations, the user interface component further includes one or more instructions executable by the processing component configured to perform one or more operations comprising: receiving an input indicative of a user performing a scrolling operation; and adjusting a visibility of the content section responsive to the input indicative of the user performing the scrolling operation. And in other implementations, the user interface component further includes one or more instructions executable by the processing component configured to perform one or more operations comprising: receiving an input indicative of a selection of a selectable item displayed within the user interface outside of the details pane; and populating at least the content section with information associated with the selection of the selectable item.

In addition, in still other implementations, the content section is a first content section and the section header is a first section header, and wherein the user interface component further includes one or more instructions executable by the processing component configured to perform one or more operations comprising: rendering a second content section associated with the scroll surface; receiving an input indicative of a selection of a selectable item displayed within the user interface; populating the first content section with a first type of information associated with the selection of the selectable item; and populating the second content section with a second type of information associated with the selection of the selectable item. In still other implementations, the second content section is rendered below the first content section on the scroll surface, and wherein the user interface component further includes one or more instructions executable by the processing component configured to perform one or more operations comprising: rendering a second section header associated with the second content section at a second position within the second content section; rendering a second upper sticky header that is a duplicate of the second section header associated with the second content section, the second upper sticky header being positioned at a second uppermost available position that is visible within the details pane, the second uppermost available position being below the uppermost available position; rendering a second lower sticky header that is a duplicate of the second section header associated with the second content section, the second lower sticky header being positioned at a second lowermost available position that is visible within the details pane, the second lowermost available position being above the lowermost available position.

In still other implementations, the user interface component further includes one or more instructions executable by the processing component configured to perform one or more operations comprising: monitoring a second location of the second section header as the second content section is scrollably moved with respect to the details pane; when the second location of the second section header is above a second uppermost available position that is visible within the details pane, causing a second upper sticky header that is a duplicate of the second content section to be visible at the second uppermost available position and causing the second section header to not be visible; when the second location of the second section header is below a second lowermost available position that is visible within the details pane, causing a second lower sticky header that is another duplicate of the second content section to be visible at the second lowermost available position and causing the second section header to not be visible; and when the location of the second section header is at or below the second uppermost available position and at or above the second lowermost available position, causing the second section header to be visible and causing the second upper sticky header and the second lower sticky header to not be visible.

In at least some implementations, the first and second content sections are rendered on a scroll surface and the upper and lower sticky headers and the second upper and lower sticky headers are rendered on a sticky header layer that is different from the scroll surface. In further alternate implementations, the first content section, the first section header, the upper sticky header, and the lower sticky header are assigned one or more associated class properties used to specify one or more behaviors which provide one or more associated layout rules. In further implementations, at least some of the one or more associated claim properties are referenced by a scripting language to obtain handles to each associated component when implementing one or more operations.

Furthermore, in at least some implementations, a system comprises: a processing component operatively coupled to a memory; a user interface component at least partially stored on the memory, the user interface component including one or more instructions executable by the processing component configured to perform one or more operations including at least: rendering a user interface including a details pane for display on a display device; rendering a scroll surface at least partially visible within the details pane, the scroll surface including a first content section having a first section header and a second content section below the first content section and having a second section header, the first and second content sections being moveable with respect to the details pane; receiving an input indicative of a user selecting the first section header; resizing the second content section to be coincident with the second section header; causing the second section header to be visible at a lowermost available position within the details pane; causing the first section header to be visible at an uppermost available position within the details pane; and causing at least a portion of the first content section to be visible within a remaining visible area of the details pane above the second section header.

In at least some implementations, at least one of causing at least a portion of the first content section or the second content section to be visible within the details pane comprises: adjusting a size of a scrollable content within the details pane based on the input indicative of the user selection.

In further implementations, causing the first section header to be visible at the uppermost available position within the details pane comprises: causing a first sticky header rendered on a sticky header layer different from the scroll surface to be visible at the uppermost available position within the details pane. In at least some further implementations, causing at least a portion of the first content section to be visible within a remaining visible area of the details pane above the second section header comprises: adjusting a height of the first content section to fill the remaining visible area of the details pane above the second section header.

In at least some further implementations the user interface component further includes one or more instructions executable by the processing component configured to perform one or more operations comprises: receiving an input indicative of the user selecting the second section header; resizing the first content section to be coincident with the first section header; causing the first section header to be visible at the uppermost available position within the details pane; causing the second section header to be visible at a next uppermost available position within the details pane; and causing at least a portion of the second content section to be visible within another remaining visible area of the details pane below the first section header.

In alternate implementations, rendering a scroll surface comprises: rendering a scroll surface that is scrollably moveable in an upward direction and in a downward direction with respect to the details pane. In still further implementations, the user interface component further includes one or more instructions executable by the processing component configured to perform one or more operations comprising: receiving an input indicative of a user performing a scrolling operation; and moving the scroll surface relative to the details pane responsive to the input indicative of the user performing the scrolling operation.

In still further implementations, causing at least a portion of the first content section to be visible within a remaining visible area of the details pane above the second section header comprises: adjusting a height of the first content section to fill the remaining visible area of the details pane above the second section header. Similarly, in still further implementations, causing at least a portion of the second content section to be visible within another remaining visible area of the details pane below the first section header comprises: adjusting a height of the second content section to fill the another remaining visible area of the details pane below the first section header.

In at least some alternate implementations, the user interface component further includes one or more instructions executable by the processing component configured to perform one or more operations comprising: receiving an input indicative of a selection of a selected item displayed within the user interface outside of the details pane; and populating the first content section with an information of a first type associated with the selected selectable item; and populating the second content section with an information of a second type associated with the selected selectable item. In addition, in other implementations, the first content section, the first section header, the second content section, and the second sticky header are assigned one or more associated class properties used to specify one or more behaviors which provide one or more associated layout rules, and wherein at least some of the one or more associated claim properties are referenced by a scripting language to obtain handles to each associated component when implementing one or more operations.

In addition, in at least some implementations, a method of operating a user interface comprises: rendering a user interface including a details pane for display on a display device; rendering a content section within a scroll surface at least partially viewable within the details pane, the content section being scrollably moveable with respect to the details pane, the content section including a section header; receiving an input indicative of a user performing a scrolling operation; moving the content section relative to the details pane responsive to the input indicative of the user performing the scrolling operation; while moving the content section, monitoring a location of the section header; when the location of the section header is above an uppermost available position, causing an upper sticky header that is a duplicate of the section header to be visible at the uppermost available position and causing the section header to not be visible; when the location of the section header is below a lowermost available position, causing a lower sticky header that is another duplicate of the section header to be visible at the lowermost available position and causing the section header to not be visible; and when the location of the section header is at or below the uppermost available position and at or above the lowermost available position, causing the section header to be visible at the location and causing the upper sticky header and the lower sticky header to not be visible.

And in at least some alternate implementations, the method further comprises: receiving an input indicative of a selection of a selectable item displayed within the user interface outside of the details pane; and populating the content section with information associated with the selected selectable item for display within the details pane.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system, comprising:
   a processing component operatively coupled to a memory;
   a user interface component at least partially stored on the memory, the user interface component including one or more instructions executable by the processing component configured to perform one or more operations including at least:
   rendering a user interface including a details pane for display on a display device;
   rendering a scroll surface at least partially visible within the details pane, the scroll surface including a first content section having a first section header and a second content section below the first content section and having a second section header, the first and second content sections being moveable with respect to the details pane;
   receiving an input indicative of a user selecting the first section header;
   resizing the second content section to be coincident with the second section header;
   causing the second section header to be visible at a lowermost available position within the details pane;
   causing the first section header to be visible at an uppermost available position within the details pane; and
   causing at least a portion of the first content section to be visible within a remaining visible area of the details pane above the second section header, wherein the first section header is caused to remain visible at the uppermost available position as the user scrolls the first content section, and the second section header is caused to remain visible at the lowermost available position as the user scrolls the first content section, until receiving an input indicative of the user selecting the second section header.

2. The system of claim 1, wherein causing the first section header to be visible at the uppermost available position within the details pane comprises:
   causing a first sticky header rendered on a sticky header layer different from the scroll surface to be visible at the uppermost available position within the details pane.

3. The system of claim 1, wherein causing at least a portion of the first content section to be visible within a remaining visible area of the details pane above the second section header comprises:
  adjusting a height of the first content section to fill the remaining visible area of the details pane above the second section header.

4. The system of claim 1, wherein the user interface component further includes one or more instructions executable by the processing component configured to perform one or more operations comprising:
  receiving an input indicative of the user selecting the second section header;
  resizing the first content section to be coincident with the first section header,
  causing the first section header to be visible at the uppermost available position within the details pane;
  causing the second section header to be visible at a next uppermost available position within the details pane; and
  causing at least a portion of the second content section to be visible within another remaining visible area of the details pane below the first section header.

5. The system of claim 4, wherein causing at least a portion of the second content section to be visible within another remaining visible area of the details pane below the first section header comprises:
  adjusting a height of the second content section to fill the another remaining visible area of the details pane below the first section header.

6. The system of claim 1, wherein the user interface component further includes one or more instructions executable by the processing component configured to perform one or more operations comprising:
  receiving an input indicative of a selection of a selected item displayed within the user interface outside of the details pane; and
  populating the first content section with an information of a first type associated with the selected selectable item; and
  populating the second content section with an information of a second type associated with the selected selectable item.

7. The system of claim 1, wherein the first content section, the first section header, the second content section, and the second sticky header are assigned one or more associated class properties used to specify one or more behaviors which provide one or more associated layout rules, and
  wherein at least some of the one or more associated class properties are referenced by a scripting language to obtain handles to each associated component when implementing one or more operations.

8. A method comprising:
  rendering a user interface including a details pane for display on a display device;
  rendering a scroll surface at least partially visible within the details pane, the scroll surface including a first content section having a first section header and a second content section below the first content section and having a second section header, the first and second content sections being moveable with respect to the details pane;
  receiving an input indicative of a user selecting the first section header;
  resizing the second content section to be coincident with the second section header;
  causing the second section header to be visible at a lowermost available position within the details pane;
  causing the first section header to be visible at an uppermost available position within the details pane; and
  causing at least a portion of the first content section to be visible within a remaining visible area of the details pane above the second section header, wherein the first section header is caused to remain visible at the uppermost available position as the user scrolls the first content section, and the second section header is caused to remain visible at the lowermost available position as the user scrolls the first content section, until receiving an input indicative of the user selecting the second section header.

9. The method of claim 8, wherein causing the first section header to be visible at the uppermost available position within the details pane comprises:
  causing a first sticky header rendered on a sticky header layer different from the scroll surface to be visible at the uppermost available position within the details pane.

10. The method of claim 8, wherein causing at least a portion of the first content section to be visible within a remaining visible area of the details pane above the second section header comprises:
  adjusting a height of the first content section to fill the remaining visible area of the details pane above the second section header.

11. The method of claim 8, further comprising:
  receiving an input indicative of the user selecting the second section header;
  resizing the first content section to be coincident with the first section header,
  causing the first section header to be visible at the uppermost available position within the details pane;
  causing the second section header to be visible at a next uppermost available position within the details pane; and
  causing at least a portion of the second content section to be visible within another remaining visible area of the details pane below the first section header.

12. The method of claim 11, wherein causing at least a portion of the second content section to be visible within another remaining visible area of the details pane below the first section header comprises:
  adjusting a height of the second content section to fill the another remaining visible area of the details pane below the first section header.

13. The method of claim 8, further comprising:
  receiving an input indicative of a selection of a selected item displayed within the user interface outside of the details pane; and
  populating the first content section with an information of a first type associated with the selected selectable item; and
  populating the second content section with an information of a second type associated with the selected selectable item.

14. The method of claim 8, wherein the first content section, the first section header, the second content section, and the second sticky header are assigned one or more associated class properties used to specify one or more behaviors which provide one or more associated layout rules, and
  wherein at least some of the one or more associated class properties are referenced by a scripting language to obtain handles to each associated component when implementing one or more operations.

15. A computer program product comprising:
a computer readable storage medium having encoded thereon:
first program instructions executable by a device to cause the device to render a user interface including a details pane for display on a display device;
second program instructions executable by the device to cause the device to render a scroll surface at least partially visible within the details pane, the scroll surface including a first content section having a first section header and a second content section below the first content section and having a second section header, the first and second content sections being moveable with respect to the details pane;
third program instructions executable by the device to cause the device to receive an input indicative of a user selecting the first section header;
fourth program instructions executable by the device to cause the device to resize the second content section to be coincident with the second section header;
fifth program instructions executable by the device to cause the device to cause the second section header to be visible at a lowermost available position within the details pane;
sixth program instructions executable by the device to cause the device to cause the first section header to be visible at an uppermost available position within the details pane; and
seventh program instructions executable by the device to cause the device to cause at least a portion of the first content section to be visible within a remaining visible area of the details pane above the second section header, wherein the first section header is caused to remain visible at the uppermost available position as the user scrolls the first content section, and the second section header is caused to remain visible at the lowermost available position as the user scrolls the first content section, until receiving an input indicative of the user selecting the second section header.

16. The computer program product of claim 15, wherein the sixth program instructions cause the device to cause a first sticky header rendered on a sticky header layer different from the scroll surface to be visible at the uppermost available position within the details pane.

17. The computer program product of claim 15, wherein the seventh program instructions cause the device to adjust a height of the first content section to fill the remaining visible area of the details pane above the second section header.

18. The computer program product of claim 15, further comprising:
eighth program instructions executable by the device to cause the device to receive an input indicative of the user selecting the second section header;
ninth program instructions executable by the device to cause the device to resize the first content section to be coincident with the first section header;
tenth program instructions executable by the device to cause the device to cause the first section header to be visible at the uppermost available position within the details pane;
eleventh program instructions executable by the device to cause the device to cause the second section header to be visible at a next uppermost available position within the details pane; and
twelfth program instructions executable by the device to cause the device to cause at least a portion of the second content section to be visible within another remaining visible area of the details pane below the first section header.

19. The computer program product of claim 18, wherein the twelfth program instructions cause the device to adjust a height of the second content section to fill the another remaining visible area of the details pane below the first section header.

20. The computer program product of claim 15, further comprising:
thirteenth program instructions executable by the device to cause the device to receive an input indicative of a selection of a selected item displayed within the user interface outside of the details pane; and
fourteenth program instructions executable by the device to cause the device to populate the first content section with an information of a first type associated with the selected selectable item; and
fifteenth program instructions executable by the device to cause the device to populate the second content section with an information of a second type associated with the selected selectable item.

* * * * *